(12) United States Patent
Takahashi et al.

(10) Patent No.: US 9,933,812 B2
(45) Date of Patent: Apr. 3, 2018

(54) DISPLAY PANEL, INPUT/OUTPUT DEVICE, AND DATA PROCESSOR

(71) Applicant: Semiconductor Energy Laboratory Co., Ltd., Kanagawa-ken (JP)

(72) Inventors: Kei Takahashi, Kanagawa (JP); Hideaki Shishido, Kanagawa (JP); Junya Maruyama, Kanagawa (JP)

(73) Assignee: Semiconductor Energy Laboratory Co., Ltd. (JP)

( * ) Notice: Subject to any disclaimer, the term of this patent is extended or adjusted under 35 U.S.C. 154(b) by 79 days.

(21) Appl. No.: 14/842,327

(22) Filed: Sep. 1, 2015

(65) Prior Publication Data

US 2016/0070314 A1    Mar. 10, 2016

(30) Foreign Application Priority Data

Sep. 5, 2014   (JP) .................................. 2014-181500

(51) Int. Cl.
*G06F 1/16* (2006.01)
*G09G 5/00* (2006.01)
(Continued)

(52) U.S. Cl.
CPC .......... *G06F 1/1601* (2013.01); *G02F 1/1345* (2013.01); *G02F 1/13452* (2013.01); *G02F 1/133308* (2013.01); *G06F 1/1643* (2013.01); *G06F 1/1652* (2013.01); *G09G 3/20* (2013.01); *G09G 5/003* (2013.01); *G02F 2001/133325* (2013.01); *G09G 2300/0426* (2013.01)

(58) Field of Classification Search
CPC ...... G09G 3/2003; G09G 5/02; G09G 3/2044; G09G 3/2051; G09G 3/2055; G09G 2320/0271; G09G 3/2048; G09G 3/3607; G09G 3/20; G09G 2300/0426; G09G 5/003; H04N 1/52; H04N 1/644; H04N 1/405; H04N 1/32251; H04N 1/4051; H04N 1/4055; G06F 1/1601; G06F 1/1652; G06F 1/1643; G02F 1/133308; G02F 1/13452; G02F 1/1345; G02F 2001/133325; G06T 11/001
See application file for complete search history.

(56) References Cited

U.S. PATENT DOCUMENTS 8,222,666 B2 * 7/2012 Hatano ................. H01L 51/003
                                                                257/79
8,956,891 B2   2/2015 Chida
(Continued)

FOREIGN PATENT DOCUMENTS

JP            2012-190794 A    10/2012

*Primary Examiner* — Grant Sitta
(74) *Attorney, Agent, or Firm* — Husch Blackwell LLP

(57) ABSTRACT

A novel display panel that is highly convenient or reliable, a novel input/output device that is highly convenient or reliable, or a novel data processor that is highly convenient or reliable is provided. The display panel includes a selection signal line, a first signal line and a second signal line that cross the selection signal line, a first pixel electrically connected to the selection signal line and the first signal line, a second pixel electrically connected to the selection signal line and the second signal line, a first terminal electrically connected to the first signal line, and a second terminal electrically connected to the second signal line.

11 Claims, 17 Drawing Sheets

(51) Int. Cl.
 *G09G 3/20* (2006.01)
 *G02F 1/1333* (2006.01)
 *G02F 1/1345* (2006.01)

(56) References Cited

U.S. PATENT DOCUMENTS

| | | | | |
|---|---|---|---|---|
| 2001/0040645 | A1* | 11/2001 | Yamazaki | G02F 1/133305 349/42 |
| 2003/0034497 | A1* | 2/2003 | Yamazaki | H01L 27/3244 257/86 |
| 2003/0129790 | A1* | 7/2003 | Yamazaki | H01L 27/3244 438/149 |
| 2004/0004129 | A1* | 1/2004 | Silverbrook | B41J 2/14 235/487 |
| 2004/0245924 | A1* | 12/2004 | Utsunomiya | H01L 27/1214 313/506 |
| 2007/0075627 | A1* | 4/2007 | Kimura | H01L 27/3213 313/503 |
| 2007/0172699 | A1* | 7/2007 | Nakashima | H01L 51/0059 428/690 |
| 2009/0108728 | A1* | 4/2009 | Ushimaru | G02F 1/133305 313/326 |
| 2011/0031491 | A1* | 2/2011 | Yamazaki | G02F 1/136227 257/43 |
| 2011/0070692 | A1* | 3/2011 | Narita | F27B 17/0025 438/104 |
| 2011/0248970 | A1* | 10/2011 | Koyama | G02F 1/13452 345/204 |
| 2012/0018627 | A1* | 1/2012 | Tredwell | H01L 27/14663 250/252.1 |
| 2012/0032193 | A1* | 2/2012 | Kurokawa | H01L 27/14632 257/84 |
| 2012/0217516 | A1 | 8/2012 | Hatano et al. | |
| 2013/0135705 | A1* | 5/2013 | Hong | G02B 26/001 359/290 |
| 2015/0162569 | A1 | 6/2015 | Chida | |

* cited by examiner

FIG. 8A-1
FIG. 8A-2
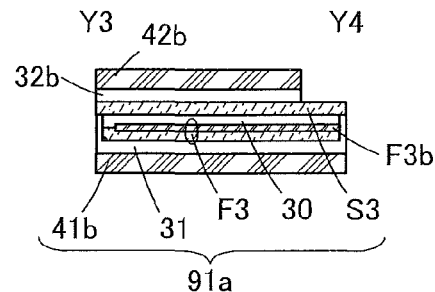
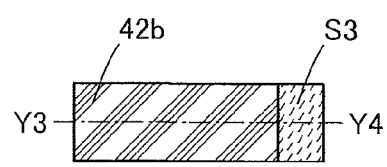
FIG. 8B-1
FIG. 8B-2
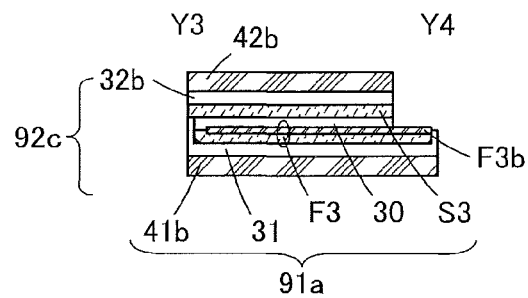
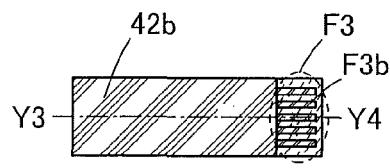
FIG. 8C-1
FIG. 8C-2
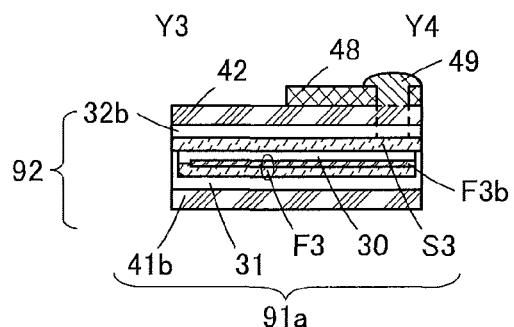
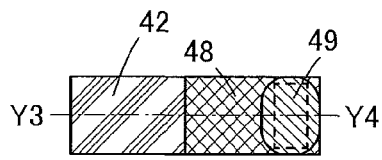
FIG. 8D-1
FIG. 8D-2
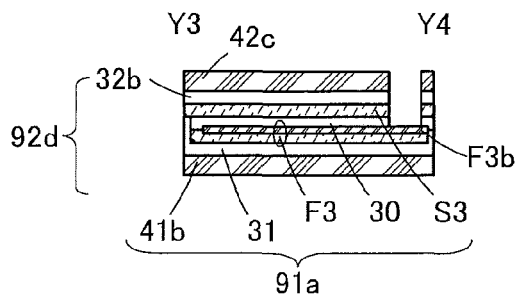
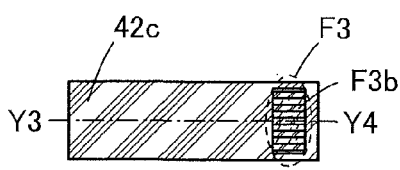

DISPLAY PANEL, INPUT/OUTPUT DEVICE, AND DATA PROCESSOR

BACKGROUND OF THE INVENTION

1. Field of the Invention

One embodiment of the present invention relates to a display panel, an input/output device, or a data processor.

Note that one embodiment of the present invention is not limited to the above technical field. The technical field of one embodiment of the invention disclosed in this specification and the like relates to an object, a method, or a manufacturing method. In addition, one embodiment of the present invention relates to a process, a machine, manufacture, or a composition of matter. Specific examples of the technical field of one embodiment of the present invention disclosed in this specification include a semiconductor device, a display device, a light-emitting device, a power storage device, an imaging device, a memory device, a method for driving any of them, and a method for manufacturing any of them.

2. Description of the Related Art

The social infrastructures relating to means for transmitting information have advanced. This has made it possible to acquire, process, and send out many pieces and various kinds of data with the use of a data processor not only at home or office but also at other visiting places.

With this being the situation, portable data processors are under active development.

For example, portable data processors are often used while being carried around by a user, and force might be accidentally applied, by dropping, to the data processors and display devices included in them. As an example of a display device that is not easily broken, a display device having high adhesiveness between a structure body by which a light-emitting layer is divided and a second electrode layer is known (Patent Document 1).

REFERENCE

Patent Document

[Patent Document 1] Japanese Published Patent Application No. 2012-190794

SUMMARY OF THE INVENTION

An object of one embodiment of the present invention is to provide a novel display panel that is highly convenient or reliable. Another object is to provide a novel input/output device that is highly convenient or reliable. Another object is to provide a novel data processor that is highly convenient or reliable. Another object is to provide a novel display panel, a novel input/output device, a novel data processor, or a novel semiconductor device.

Note that the description of these objects does not preclude the existence of other objects. In one embodiment of the present invention, there is no need to achieve all the objects. Other objects will be apparent from and can be derived from the description of the specification, the drawings, the claims, and the like.

One embodiment of the present invention is a display panel including a selection signal line that extends in a row direction; a first signal line that extends in a column direction which crosses the row direction; a second signal line that extends along the first signal line which crosses the row direction; a first pixel electrically connected to the selection signal line and the first signal line; a second pixel electrically connected to the selection signal line and the second signal line; a first terminal electrically connected to the first signal line; a second terminal electrically connected to the second signal line and including a region overlapping with the first signal line; an insulating layer between the first signal line and the second terminal; and a base that supports the selection signal line, the first signal line, the second signal line, the first pixel, the second pixel, the first terminal, the second terminal, and the insulating layer.

Another embodiment of the present invention is the above display panel in which a distance in the column direction between the first terminal and the second terminal is greater than or equal to 0.45 times a distance in the row direction between the first pixel and the second pixel.

Another embodiment of the present invention is the above display panel in which the base has flexibility and a shrinkage of less than or equal to 3%.

The display panel of one embodiment of the present invention includes the selection signal line, the first signal line and second signal line that cross the selection signal line, the first pixel electrically connected to the selection signal line and the first signal line, the second pixel electrically connected to the selection signal line and the second signal line, the first terminal electrically connected to the first signal line, and the second terminal electrically connected to the second signal line. With this structure, image signals, for example, can be supplied to pixels that are finely arranged. As a result, a novel display panel can be provided.

Another embodiment of the present invention is the above display panel in which an area of the first terminal is larger than an area of the first pixel.

The display panel of one embodiment of the present invention includes the pixel and the terminal having an area larger than the area of the pixel. With this structure, a contact of a driver circuit, and the terminal having an area larger than that of the pixel can be electrically connected to each other with high reliability, for example, and an image signal, for example, can be supplied to the pixel having an area smaller than that of the terminal. As a result, a novel display panel can be provided.

Another embodiment of the present invention is the above display panel further including a terminal portion including the first terminal, the second terminal, a third terminal, and a fourth terminal of which a center is a distance L away from a center of the third terminal.

The driver circuit is in the terminal portion. The driver circuit includes a third contact electrically connected to the third terminal and a fourth contact electrically connected to the fourth terminal. A sum A, a sum B, and the distance L satisfy the following formula. The sum A is the sum of a distance a1 and a distance a2, the distance a1 is a distance from a position where a straight line through the center of the third terminal and the center of the fourth terminal starts crossing the third contact to a position where the straight line completes crossing the third contact, and the distance a2 is a distance from a position where the straight line starts crossing the fourth contact to a position where the straight line completes crossing the fourth contact. The sum B is the sum of a distance b1 and a distance b2, the distance b1 is a distance from a position where the straight line starts crossing the third terminal to a position where the straight line completes crossing the third terminal, and the distance b2 is a distance from a position where the straight line starts crossing the fourth terminal to a position where the straight line completes crossing the fourth terminal.

$$-7\times10^{-3} < \frac{(A+B)}{2L} < 7\times10^{-3} \quad \text{[Formula 1]}$$

Another embodiment of the present invention is the above display panel in which the terminal portion further includes a fifth terminal adjacent to the third terminal and a sixth terminal adjacent to the fourth terminal. The sum A, the sum B, a sum C, and the distance L satisfy the following formula, where C is the sum of a distance between the third terminal and the fifth terminal and a distance between the fourth terminal and the sixth terminal.

$$-7\times10^{-3} < \frac{(-A+B+2C)}{2L} < 7\times10^{-3} \quad \text{[Formula 2]}$$

The display panel of one embodiment of the present invention includes the terminal portion where a plurality of terminals are arranged to satisfy the conditions represented by the above formulas, and the driver circuit including contacts electrically connected to the terminals arranged in the terminal portion. With this structure, even when the dimensions of the terminal portion change during a manufacturing process, for example, the contacts of the driver circuit and the terminals can be electrically connected to each other highly reliably, and an image signal, for example, can be supplied to the pixel. As a result, a novel display panel can be provided.

Another embodiment of the present invention is an input/output device including the above display panel and a sensor panel having a region overlapping with the first pixel and the second pixel of the display panel.

The input/output device of one embodiment of the present invention includes the display panel including the selection signal line, the first signal line and second signal line that cross the selection signal line, the first pixel electrically connected to the selection signal line and the first signal line, the second pixel electrically connected to the selection signal line and the second signal line, the first terminal electrically connected to the first signal line, and the second terminal electrically connected to the second signal line; and the sensor panel having a region overlapping with the first and second pixels.

With this structure, it becomes possible to display an image with high resolution and to supply an operation instruction in association with the displayed image data. Accordingly, a novel input/output device can be provided.

Another embodiment of the present invention is a data processor including the above display panel and at least one of a microphone, an antenna, a battery, an operation switch, and a housing.

The data processor of one embodiment of the present invention includes the display panel including the selection signal line, the first line and second signal line that cross the selection signal line, the first pixel electrically connected to the selection signal line and the first signal line, the second pixel electrically connected to the selection signal line and the second signal line, the first terminal electrically connected to the first signal line, and the second terminal electrically connected to the second signal line; and one of the microphone, the antenna, the battery, the operation switch, and the housing. With this structure, it becomes possible to display an image with high resolution. As a result, a novel data processor can be provided.

According to one embodiment of the present invention, a novel display panel that is highly convenient or reliable can be provided. According to another embodiment of the present invention, a novel input/output device that is highly convenient or reliable can be provided. According to another embodiment of the present invention, a novel data processor that is highly convenient or reliable can be provided. According to another embodiment of the present invention, a novel display panel, a novel input/output device, a novel data processor, or a novel semiconductor device can be provided.

Note that the description of these effects does not preclude the existence of other effects. One embodiment of the present invention need not necessarily achieve all the effects listed above. Other effects will be apparent from and can be derived from the description of the specification, the drawings, the claims, and the like.

BRIEF DESCRIPTION OF THE DRAWINGS

In the accompanying drawings:

FIGS. 6A-1, 6A-2, 6B-1, 6B-2, 6C, 6D-1, 6D-2, 6E-1, and 6E-2 are schematic views illustrating a manufacturing process of a stack of one embodiment;

FIGS. 7A-1, 7A-2, 7B, 7C, 7D-1, 7D-2, 7E-1, and 7E-2 are schematic views illustrating a manufacturing process of a stack of one embodiment;

FIGS. 8A-1, 8A-2, 8B-1, 8B-2, 8C-1, 8C-2, 8D-1, and 8D-2 are schematic views illustrating manufacturing processes of stacks, each having an opening portion in a support, of embodiments;

FIGS. 9A-1, 9A-2, 9B-1, and 9B-2 are schematic views illustrating structures of a processed member of one embodiment;

FIGS. 11A-1, 11A-2, 11A-3, 11B-1, 11B-2, 11C-1, and 11C-2 are projection views illustrating structures of data processors of embodiments;

DETAILED DESCRIPTION OF THE INVENTION

Figure 1A:
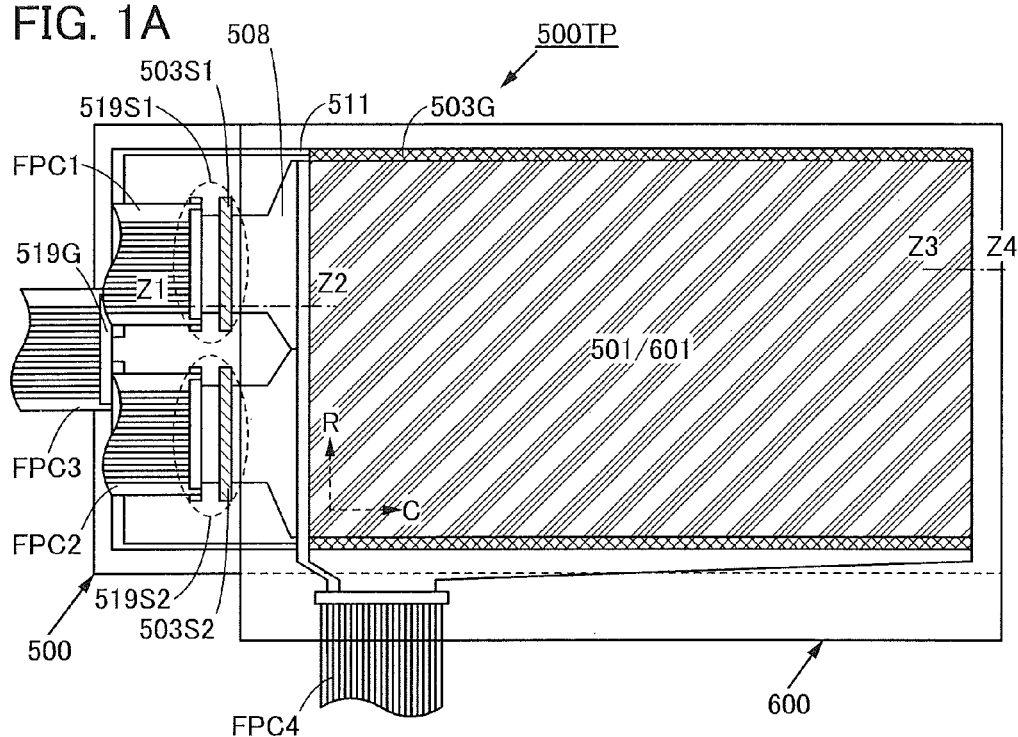
FIGS. 1A to 1C illustrates an input/output device including a display panel of one embodiment.

The display panel of one embodiment of the present invention includes the selection signal line, the first line and second signal line that cross the selection signal line, the first pixel electrically connected to the selection signal line and the first signal line, the second pixel electrically connected to the selection signal line and the second signal line, the first terminal electrically connected to the first signal line, and the second terminal electrically connected to the second signal line.

With this structure, image signals can be supplied to pixels that are finely arranged. As a result, a novel display panel, a novel input/output device, a novel data processor, or a novel semiconductor device can be provided.

Embodiments will be described in detail with reference to drawings. Note that the present invention is not limited to the description below, and it is easily understood by those skilled in the art that various changes and modifications can be made without departing from the spirit and scope of the present invention. Accordingly, the present invention should not be interpreted as being limited to the content of the embodiments below. Note that in the structures of the invention described below, the same portions or portions having similar functions are denoted by the same reference numerals in different drawings, and description of such portions is not repeated.

Embodiment 1

In this embodiment, a structure of a display panel of one embodiment of the present invention will be described with reference to FIGS. 1A to 1C, FIGS. 2A to 2C, FIGS. 12A and 12B, FIGS. 13A and 13B, FIGS. 14A to 14D, FIGS. 15A and 15B and FIGS. 16A and 16B.

Figure 1B:
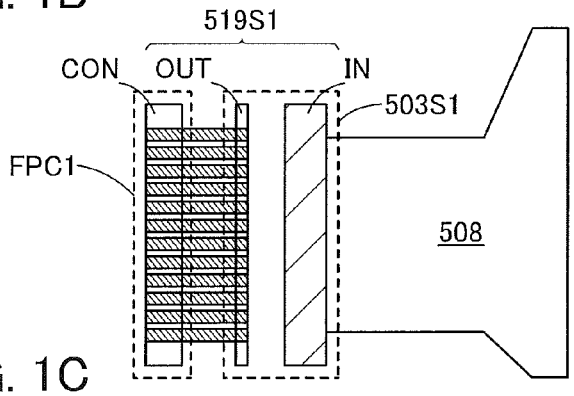
Figure 1C:
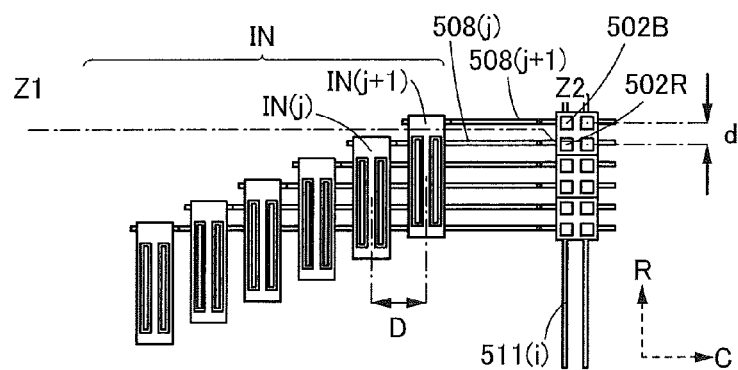

FIGS. 1A to 1C illustrate a structure of an input/output device 500TP that includes a display panel 500 of one embodiment of the present invention.

FIG. 1A is a top view illustrating the structure of the input/output device 500TP, FIG. 1B is a top view illustrating a structure of a terminal portion 519S1 included in the display panel 500, and FIG. 1C is a top view illustrating pixels, wirings, and terminals included in the display panel 500.

Figure 2A:
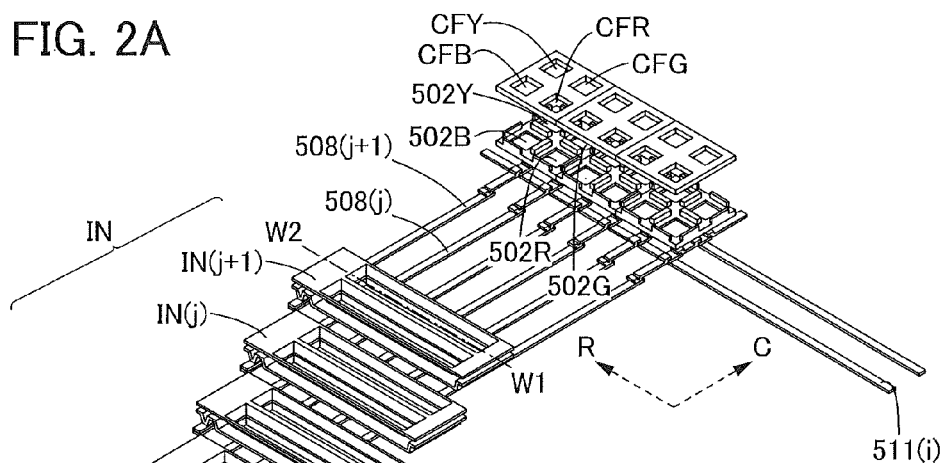
FIGS. 2A to 2C illustrate an input/output device including a display panel of one embodiment.
Figure 2B:
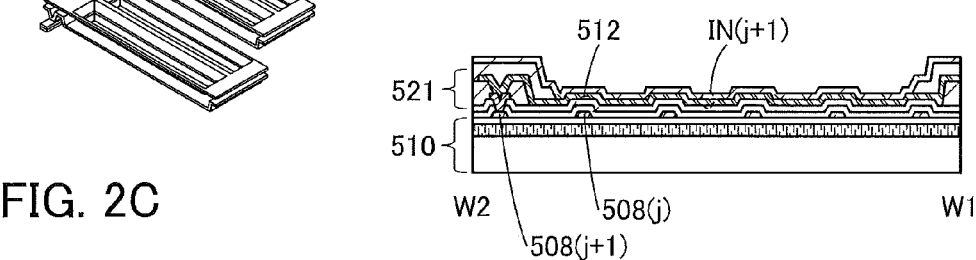
Figure 2C:
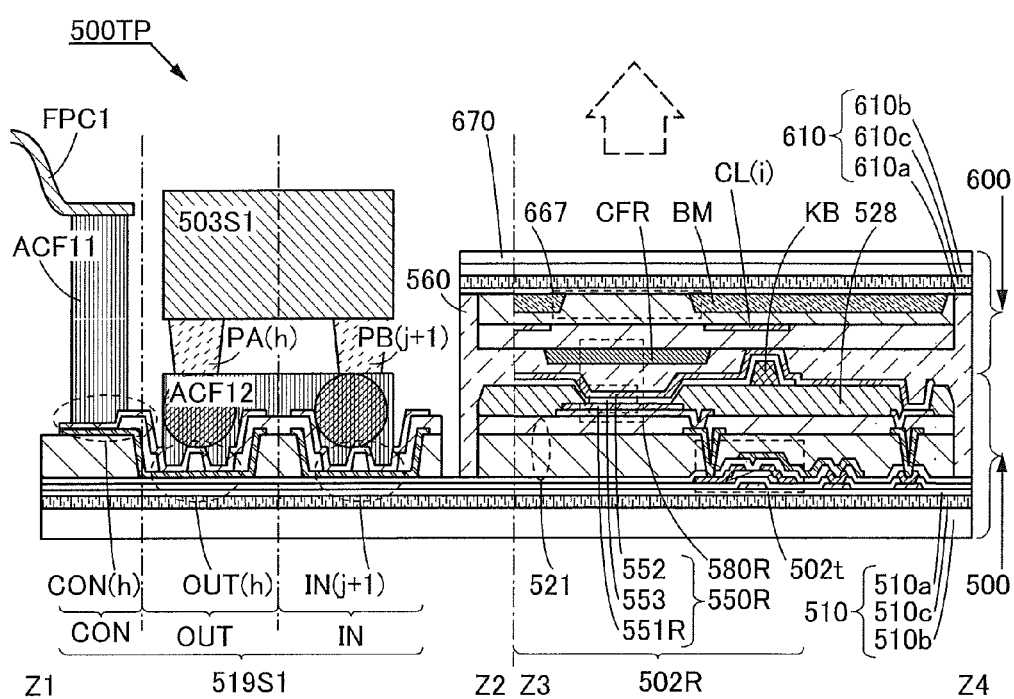

FIG. 2A is a projection view illustrating the pixels, wirings, and terminals included in the display panel 500, FIG. 2B is a cross-sectional view of a second terminal IN(j+1) taken along the line W1-W2 in FIG. 2A, and FIG. 2C is a cross-sectional view of the input/output device 500TP taken along the line Z1-Z2 and the line Z3-Z4 in FIG. 1A.

FIGS. 12A and 12B, FIGS. 13A and 13B, and FIGS. 14A to 14D are a top view and cross-sectional views illustrating modification examples of a structure that can be used in the terminal portion of the input/output device 500TP of one embodiment of the present invention.

FIGS. 15A and 15B and FIGS. 16A and 16B are schematic views illustrating the arrangement of terminals that can be used in the terminal portion of the input/output device 500TP of one embodiment of the present invention.

<Structural Example 1 of Display Panel>

The display panel 500 described in this embodiment includes a selection signal line 511(i), a first signal line 508(j), a second signal line 508(j+1), a first pixel 502R, a second pixel 502B, a first terminal IN(j), the second terminal IN(j+1), an insulating layer 512, and a base 510 (see FIGS. 2A and 2B). Note that i is a natural number of m or less, j is a natural number of n−1 or less, m is a natural number of 1 or more, and n is a natural number of 2 or more.

The selection signal line 511(i) extends in the row direction indicated by the arrow R in the drawings (see FIGS. 1A and 1C, and FIG. 2A).

The first signal line 508(j) extends in the column direction indicated by the arrow C in the drawings, which crosses the selection signal line 511(i).

The second signal line 508(j+1) extends along the first signal line 508(j) that crosses the selection signal line 511(i).

The first pixel 502R is electrically connected to the selection signal line 511(i) and the first signal line 508(j).

The second pixel 502B is electrically connected to the selection signal line 511(i) and the second signal line 508(j+1).

The first terminal IN(j) is electrically connected to the first signal line 508(j).

The second terminal IN(j+1) is electrically connected to the second signal line 508(j+1), and has a region overlapping with the first signal line 508(j) (see FIGS. 2A and 2B).

The insulating layer 512 is provided between the first signal line 508(j) and the second terminal IN(j+1).

The base 510 supports the selection signal line 511(i), the first signal line 508(j), the second signal line 508(j+1), the first pixel 502R, the second pixel 502B, the first terminal IN(j), the second terminal IN(j+1), and the insulating layer 512.

A distance D in the column direction between the first terminal IN(j) and the second terminal IN(j+1) is greater than or equal to 0.45 times and less than or equal to 40 times a distance d in the row direction between the first pixel 502R and the second pixel 502B, preferably greater than or equal to 1 time and less than or equal to 40 times the distance d in the row direction between the first pixel 502R and the second pixel 502B (see FIG. 1C).

More preferably, the distance D in the column direction between the first terminal IN(j) and the second terminal IN(j+1) is greater than or equal to 2 times and less than or equal to 40 times the distance d in the row direction between the first pixel 502R and the second pixel 502B.

The base 510 has flexibility and a shrinkage of less than or equal to 3%, preferably less than or equal to 2%, and more preferably less than or equal to 1%. The shrinkage being too high reduces productivity. Note that the shrinkage refers to a ratio of a change in the dimensions of the base 510 caused in the manufacturing process of the display panel 500 to the dimensions of the base 510 before the process. The dimensions of the base 510 are changed by the heat applied during the process, for example.

The display panel 500 described in this embodiment includes the selection signal line 511(i), the first signal line 508(j) and the second signal line 508(j+1) that cross the selection signal line 511(i), the first pixel 502R that is electrically connected to the selection signal line 511(i) and the first signal line 508(j), the second pixel 502B that is electrically connected to the selection signal line 511(i) and the second signal line 508(j+1), the first terminal IN(j) that is electrically connected to the first signal line 508(j), and the second terminal IN(j+1) that is electrically connected to the second signal line 508(j+1). With this structure, image signals, for example, can be supplied to the pixels that are finely arranged. As a result, a novel display panel can be provided.

The area of the first terminal IN(j) is larger than the area of the first pixel 502R (see FIG. 1C).

The display panel 500 described in this embodiment includes the first pixel 502R and the first terminal IN(j) having an area larger than the area of the first pixel 502R. With this structure, a contact of a driver circuit and the terminal having an area larger than that of the pixel can be electrically connected to each other with high reliability, for example, and an image signal, for example, can be supplied to the pixel having an area smaller than that of the terminal. As a result, a novel display panel can be provided.

Furthermore, the display panel 500 can be provided with a group 508 of signal lines, the terminal portion 519S1, a terminal portion 519S2, a terminal portion 519G, a driver circuit 503S1, a driver circuit 503S2, a flexible printed circuit FPC1, a flexible printed circuit FPC2, and a flexible printed circuit FPC3.

The group 508 of signal lines includes the first signal line 508(j) and the second signal line 508(j+1). In addition, the group 508 of signal lines has a function of being supplied with and supplying a secondary image signal or the like (see FIG. 1A).

The terminal portion 519S1 includes a terminal portion IN, a terminal portion OUT, and a terminal portion CON (see FIG. 1B). The terminal portion IN and the terminal portion OUT are electrically connected to the driver circuit 503S1. The terminal portion CON is electrically connected to the flexible printed circuit FPC1.

For example, an anisotropic conductive film ACF11 electrically connects the terminal portion CON to the flexible printed circuit FPC1. An anisotropic conductive film ACF12 electrically connects the terminal portion OUT to the driver circuit 503S1, and the terminal portion IN to the driver circuit 503S1 (see FIG. 2C). More specifically, the anisotropic conductive film ACF11 electrically connects a terminal CON(h) to one terminal included in the flexible printed circuit FPC1. The anisotropic conductive film ACF12 electrically connects a terminal OUT(h) to a contact PA(h) of the driver circuit 503S1, and the second terminal IN(j+1) to a contact PB(j+1) of the driver circuit 503S1.

The terminal portion 519S2 includes a terminal electrically connected to the driver circuit 503S2, a terminal electrically connected to the flexible printed circuit FPC2, and the like.

The driver circuit 503S1 and the driver circuit 503S2 each have a function of being supplied with a primary image signal, a control signal, or the like and supplying a secondary image signal or the like (see FIG. 1A).

The flexible printed circuit FPC1 and the flexible printed circuit FPC2 each have a function of being supplied with and supplying a primary image signal or a control signal.

The display panel 500 can be provided with a display region 501.

The display region 501 can be provided with a plurality of pixels 502.

The pixel 502 can be provided with a plurality of pixels displaying different colors. For example, the pixel 502 can be provided with the pixel 502R, a pixel 502G, the pixel 502B, or a pixel 502Y. In that case, the pixel 502R, the pixel 502G, the pixel 502B, or the pixel 502Y can be referred to as a subpixel of the pixel 502.

The pixel 502R, the pixel 502G, the pixel 502B, and the pixel 502Y can be provided with a coloring layer CFR, a coloring layer CFG, a coloring layer CFB, and a coloring layer CFY, respectively.

In addition, the display panel 500 can be provided with a driver circuit 503G, a wiring 511, and the terminal portion 519G (see FIG. 1A).

The driver circuit 503G has a function of being supplied with a control signal or the like and supplying a selection signal.

The wiring 511 has a function of being supplied with and supplying a control signal or the like.

The terminal portion 519G can be provided with a terminal electrically connected to the flexible printed circuit FPC3.

Individual components included in the display panel 500 will be described below. Note that these units cannot be clearly distinguished and one unit also serves as another unit or include part of another unit in some cases.

The display panel 500 can be used with a sensor panel 600 placed thereover. The detailed structure of the sensor panel 600 will be described in Embodiment 2.

<<Overall Structure>>

The display panel 500 described in this embodiment is provided with the selection signal line, the group 508 of signal lines, the pixels 502, the terminals, or the base 510 (see FIGS. 1A to 1C and FIGS. 2A to 2C).

Note that the pixels 502 and the like may be formed by depositing films over the base 510 and processing the films. Alternatively, the display panel 500 may be formed in such a manner that part of the display panel 500 is formed over another base and the part is transferred to the base 510.

<<Wiring>>

The display panel 500 is provided with the selection signal line 511(i), the wiring 511, the group 508 of signal lines, or the like. The group 508 of signal lines includes the first signal line 508(j), the second signal line 508(j+1), or the like.

A conductive material can be used for the wirings and the like.

For example, a conductive film 411 that can be used for a gate electrode of a transistor 502t can be used for the first signal line 508(j) or the selection signal line 511(i) (see FIGS. 12A and 12B, and FIGS. 13A and 13B).

For example, an inorganic conductive material, an organic conductive material, metal, conductive ceramics, or the like can be used for the wiring.

Specifically, a metal element selected from aluminum, gold, platinum, silver, chromium, tantalum, titanium, molybdenum, tungsten, nickel, iron, cobalt, yttrium, zirconium, palladium, and manganese; an alloy including any of the above metal elements; an alloy including any of the above metal elements in combination; or the like can be used for the wiring and the like. In particular, one or more elements selected from aluminum, chromium, copper, tantalum, titanium, molybdenum, and tungsten are preferably included. In particular, an alloy of copper and manganese is suitably used in microfabrication with the use of a wet etching method.

Specifically, a two-layer structure in which a titanium film is stacked over an aluminum film, a two-layer structure in which a titanium film is stacked over a titanium nitride film, a two-layer structure in which a tungsten film is stacked over a titanium nitride film, a two-layer structure in which a tungsten film is stacked over a tantalum nitride film or a tungsten nitride film, a three-layer structure in which a titanium film, an aluminum film, and a titanium film are stacked in this order, or the like can be used.

Specifically, an alloy film or a nitride film in which aluminum and one or more elements selected from titanium, tantalum, tungsten, molybdenum, chromium, neodymium, and scandium are combined may be used.

Alternatively, a conductive oxide such as indium oxide, indium tin oxide, indium zinc oxide, zinc oxide, or zinc oxide to which gallium is added can be used.

Alternatively, graphene or graphite can be used. The film including graphene can be formed, for example, by reducing a film containing graphene oxide. As a reducing method, a method using heat, a method using a reducing agent, or the like can be employed.

Alternatively, a conductive polymer can be used.

<<Pixel>>

The pixel 502R, the pixel 502B, the pixel 502G, and the pixel 502Y each include a display element and a pixel circuit that drives the display element.

The pixels are arranged at a density of 600 ppi or higher, preferably 1800 ppi or higher, and more preferably 2000 ppi or higher, for example. Note that ppi (pixel per inch) is a unit indicating the number of pixels per inch. In the case where three subpixels constitute one pixel, for example, the three subpixels may be regarded as one repeating unit. However, in this specification, one subpixel connected to one signal line is regarded as one unit.

<<Pixel Circuit>>

An active matrix method in which an active element is included in a pixel or a passive matrix method in which an active element is not included in a pixel can be employed for the display panel 500.

In the active matrix method, as an active element (a non-linear element), not only a transistor but also various active elements (non-linear elements) can be used. For example, a metal insulator metal (MIM), a thin film diode (TFD), or the like can also be used. Since such an element has few numbers of manufacturing steps, manufacturing cost can be reduced or yield can be improved. Alternatively, since the size of the element is small, the aperture ratio can be improved, so that power consumption can be reduced or higher luminance can be achieved.

As a method other than the active matrix method, the passive matrix method in which an active element (a non-linear element) is not used can also be used. Since an active element (a non-linear element) is not used, the number of manufacturing steps is small, so that manufacturing cost can be reduced or yield can be improved. Alternatively, since an active element (a non-linear element) is not used, the aperture ratio can be improved, so that power consumption can be reduced or higher luminance can be achieved, for example.

The pixel circuit includes the transistor 502t, for example (see FIG. 2C). The conductive film 411 can be used for a gate electrode, and a conductive film 415 can be used for a source electrode or a drain electrode, for example. In addition, a conductive film 416 may be arranged such that a semiconductor layer is positioned between the conductive film 411 and the conductive film 416.

The display panel 500 includes an insulating film 521 covering the transistor 502t. The insulating film 521 can be used as a layer for planarizing unevenness caused by the pixel circuits. A stacked-layer film including a layer that can prevent diffusion of impurities can be used as the insulating film 521. This can prevent decrease of the reliability of the transistor 502t or the like due to diffusion of impurities.

For example, a stack including an insulating film 521a, an insulating film 521b, and an insulating film 521c can be used as the insulating film 521. For example, a resin or an inorganic material can be used for the insulating film 521.

Specifically, a stack including a polyimide film, an acrylic resin film, a silicon oxide film, a silicon nitride film, a silicon oxynitride film, or the like can be used as the insulating film 521. For example, a film containing nitrogen and silicon can be used as the insulating film 521a, and a film containing polyimide can be used as each of the insulating film 521b and the insulating film 521c (FIGS. 12A and 12B, and FIGS. 13A and 13B).

<<Display Element>>

Various display elements can be used for the display panel 500. For example, any of display elements (electronic ink) that perform display by an electrophoretic method, an electronic liquid powder (registered trademark) method, an electrowetting method, or the like, MEMS shutter display elements, optical interference type MEMS display elements, and liquid crystal elements can be used.

Furthermore, a display element that can be used for a transmissive liquid crystal display, a transflective liquid crystal display, a reflective liquid crystal display, a direct-view liquid crystal display, or the like can be used.

For a transflective liquid crystal display or a reflective liquid crystal display, some of or all of pixel electrodes function as reflective electrodes. For example, some or all of pixel electrodes are formed to contain aluminum, silver, or the like.

A memory circuit such as an SRAM can be provided below the reflective electrodes. Accordingly, power consumption can be further reduced. A structure suitable for display elements to be used can be selected from a variety of pixel circuits.

For example, organic electroluminescent elements that emit light of different colors may be used for different pixels.

For example, an organic electroluminescent element that emits white light can be used.

For example, a light-emitting element 550R that includes a lower electrode 551R, an upper electrode 552, and a layer 553 containing a light-emitting organic compound and being between the lower electrode 551R and the upper electrode 552 can be used as the display element (see FIG. 2C).

<<Light-Emitting Module>>

The pixel 502R includes a light-emitting module 580R and a pixel circuit. The light-emitting module 580R includes the light-emitting element 550R and an optical element (e.g., the coloring layer CFR). The pixel circuit includes the transistor 502t that can supply power to the light-emitting element 550R.

Note that to efficiently extract light having a specific wavelength, a microresonator structure may be provided in the light-emitting module 580R. Specifically, a layer containing a light-emitting organic compound may be provided between a film that reflects visible light, which is provided to efficiently extract certain light, and a semi-transmissive and semi-reflective film.

The light-emitting module 580R includes the coloring layer CFR on the light extraction side. The coloring layer transmits light of a specific wavelength and is, for example, the coloring layer CFR that selectively transmits light of red, the coloring layer CFG that selectively transmits light of green, the coloring layer CFB that selectively transmits light of blue, the coloring layer CFY that selectively transmits light of yellow, or the like. Note that a window portion where the coloring layer is not provided may be arranged to overlap with the light-emitting element so that light from the light-emitting element can be emitted without passing through the coloring layer.

The coloring layer CFR includes a region that overlaps with the light-emitting element 550R. Accordingly, part of light emitted from the light-emitting element 550R passes through the coloring layer CFR and is emitted to the outside of the light-emitting module 580R as indicated by an arrow in FIG. 2C.

A light-blocking layer BM having an opening portion 667 that overlaps with the coloring layer (e.g., the coloring layer CFR) is provided.

Note that in the case where a sealant 560 is provided on a side from which light is extracted, the sealant 560 may be in contact with the light-emitting element 550R and the coloring layer CFR.

The lower electrode 551R is provided over the insulating film 521. A partition 528 having an opening portion that overlaps with the lower electrode is provided. Note that part of the partition 528 overlaps with an end portion of the lower electrode.

In addition, a spacer KB that controls the distance between a base 610 and the base 510 is provided over the partition 528.

<<Structure of Driver Circuit>>

The driver circuit 503G supplies a selection signal. For example, the driver circuit 503G supplies a selection signal to the selection signal line 511(*i*).

The driver circuit 503S1 or the driver circuit 503S2 is supplied with a primary image signal, and supplies a secondary image signal. For example, the driver circuit 503S1 or the driver circuit 503S2 is supplied with a primary image signal from the terminal portion OUT, and supplies a secondary image signal to the terminal portion IN (see FIG. 2C). Note that the first terminal IN(j) supplies a secondary image signal to the first signal line 508(*j*), and the second terminal IN(j+1) supplies a secondary image signal to the second signal line 508(*j*+1).

For example, a shift register, a flip-flop circuit, a combination circuit, or the like can be used as the driver circuit 503G, the driver circuit 503S1, or the driver circuit 503S2.

A transistor that can be formed in the same process over the same substrate as the pixel circuit may be used in the driver circuit 503G, for example.

An integrated circuit including a transistor formed in a process different from that of the pixel circuit may be used for the driver circuit 503S1 or the driver circuit 503S2, for example. The mounting of the integrated circuit can be performed using a chip on film (COF) method or a tape automated bonding (TAB) method.

<<Terminal>>

The display panel 500 includes the terminal portion 519S1, the terminal portion 519S2, or the terminal portion 519G (see FIG. 1A).

The terminal portion 519S1 includes the terminal portion CON, the terminal portion OUT, and the terminal portion IN (see FIG. 1B). The terminal portion CON includes the terminal CON(h) electrically connected to the flexible printed circuit FPC1, the terminal portion OUT includes the terminal OUT(h) electrically connected to the contact PA(h) of the driver circuit 503S1, and the terminal portion IN includes the second terminal IN(j+1) electrically connected to the contact PB(j+1) of the driver circuit 503S1 (see FIG. 2C).

On the terminal portion CON, the terminal portion OUT, and the terminal portion IN, terminals are arranged in accordance with the arrangement of the contacts of the driver circuits (see FIGS. 15A and 15B, and FIGS. 16A and 16B). For example, the terminal portion IN includes more terminals than the terminal portion CON. Specifically, the structure shown in FIG. 15A can be used in the terminal portion CON, the structure shown in FIG. 15B can be used in the terminal portion OUT, and the structure shown in FIG. 16A or the structure shown in FIG. 16B can be used in the terminal portion IN.

For example, the terminal portion IN includes a plurality of terminals including the first terminal IN(j) and the second terminal IN(j+1).

In the terminal portion IN in which the first terminal IN(j) and the second terminal IN(j+1) are arranged, terminals are arranged at a density of 500 or more per inch, more preferably 1400 or more per inch, for example.

The first terminal IN(j) is electrically connected to the first signal line 508(*j*), and the second terminal IN(j+1) is electrically connected to the second signal line 508(*j*+1) (see FIG. 2A).

The terminal portion CON has a function of being supplied with a primary image signal from the flexible printed circuit FPC1 and supplying the primary image signal. The terminal portion OUT has a function of being supplied with a primary image signal from the terminal portion CON and supplying the primary image signal. The terminal portion IN has a function of being supplied with a secondary image signal from the driver circuit 503S1 and supplying the secondary image signal.

The terminal portion 519S2 includes the terminal electrically connected to the flexible printed circuit FPC2, and a terminal electrically connected to a contact of the driver circuit 503S2 (see FIG. 1A).

The terminal portion 519G includes the terminal electrically connected to the flexible printed circuit FPC3.

A material similar to the material for the wirings can be used for the terminals.

Figure 12A:
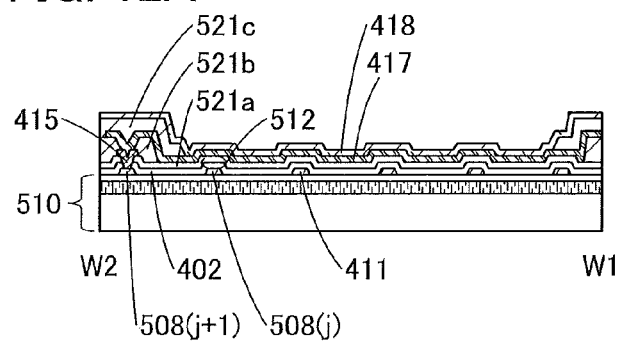
FIGS. 12A and 12B illustrate an input/output device including a display panel of one embodiment.
Figure 12B:
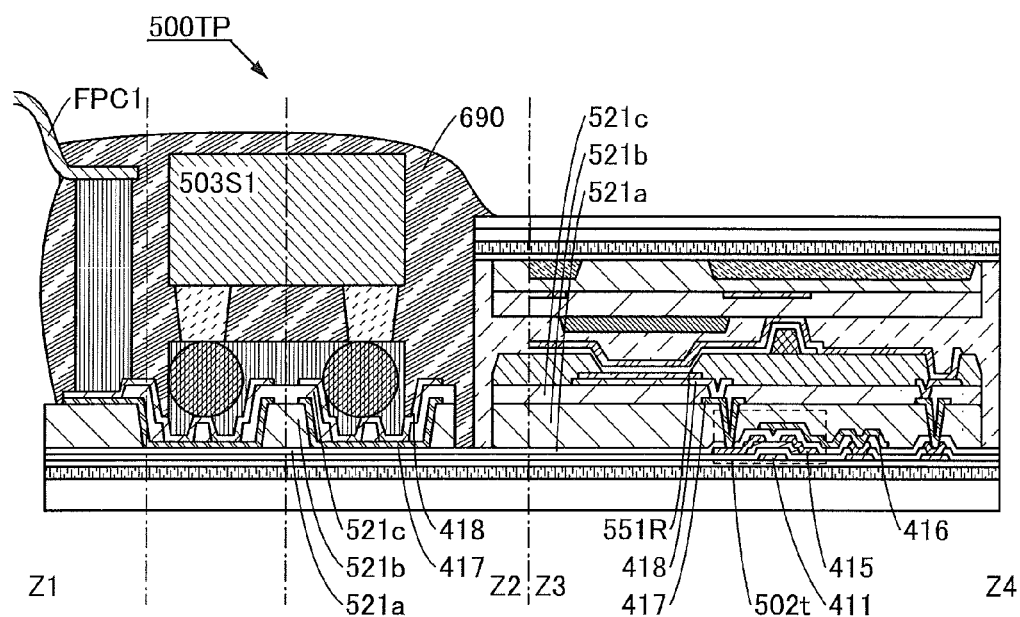
Figure 13A:
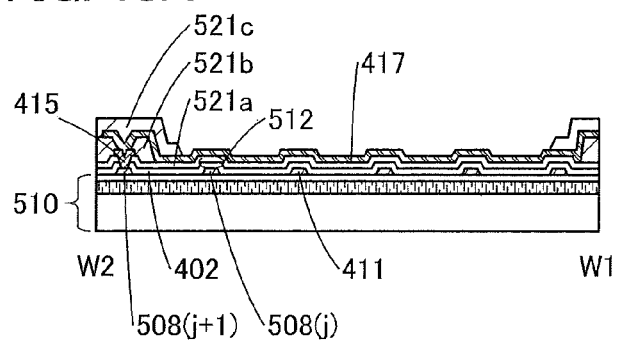
FIGS. 13A and 13B illustrate an input/output device including a display panel of one embodiment.
Figure 13B:
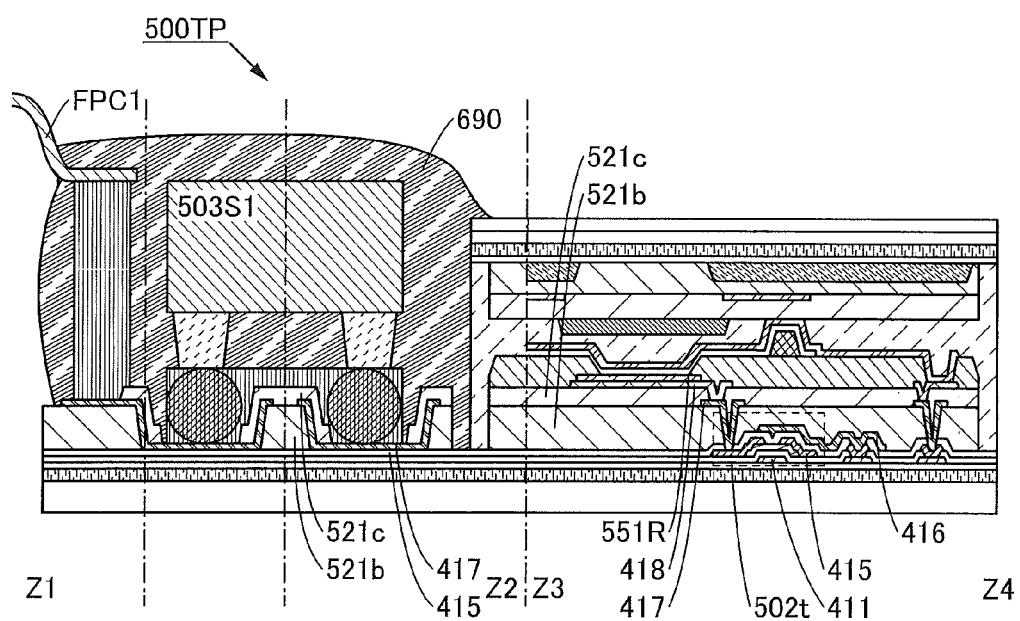
Figure 14A:
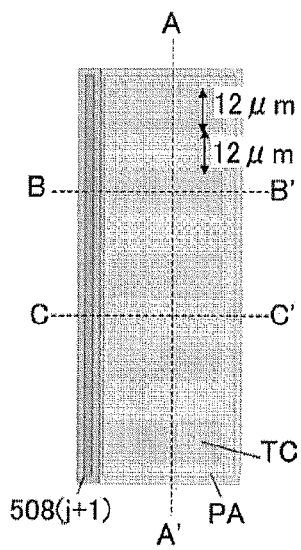
FIGS. 14A to 14D illustrate a terminal of a display panel of one embodiment.
Figure 14B:
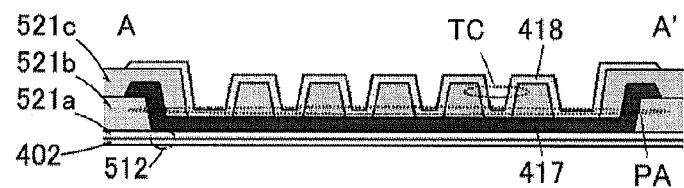
Figure 14C:
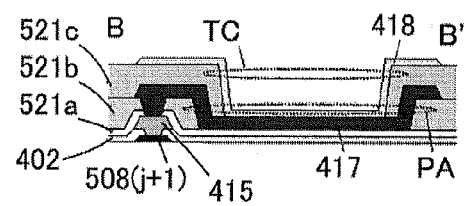
Figure 14D:
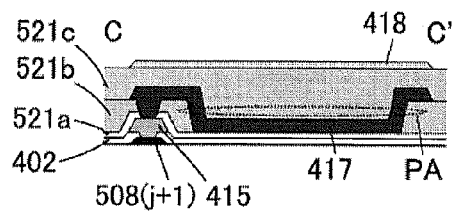
Figure 15A:
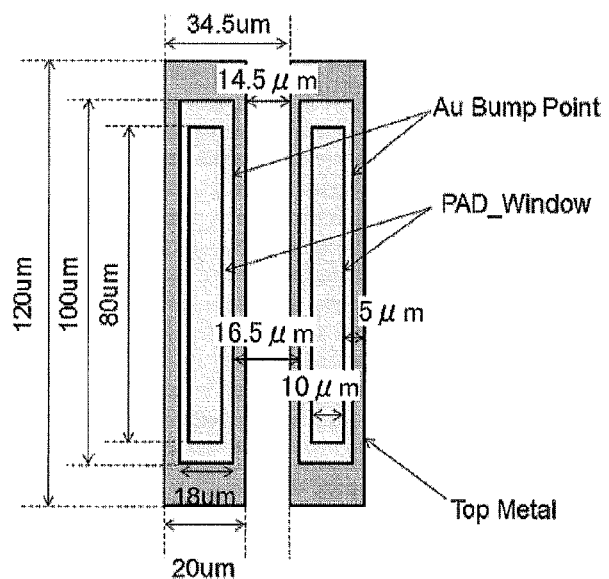
FIGS. 15A and 15B illustrate a terminal of a display panel of one embodiment.
Figure 15B:
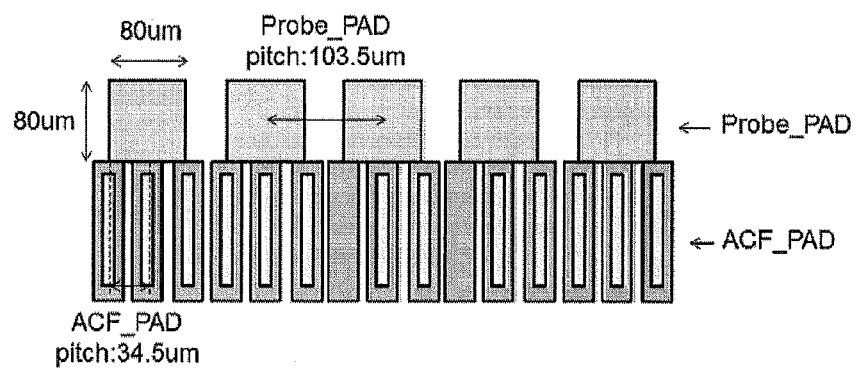
Figure 16A:
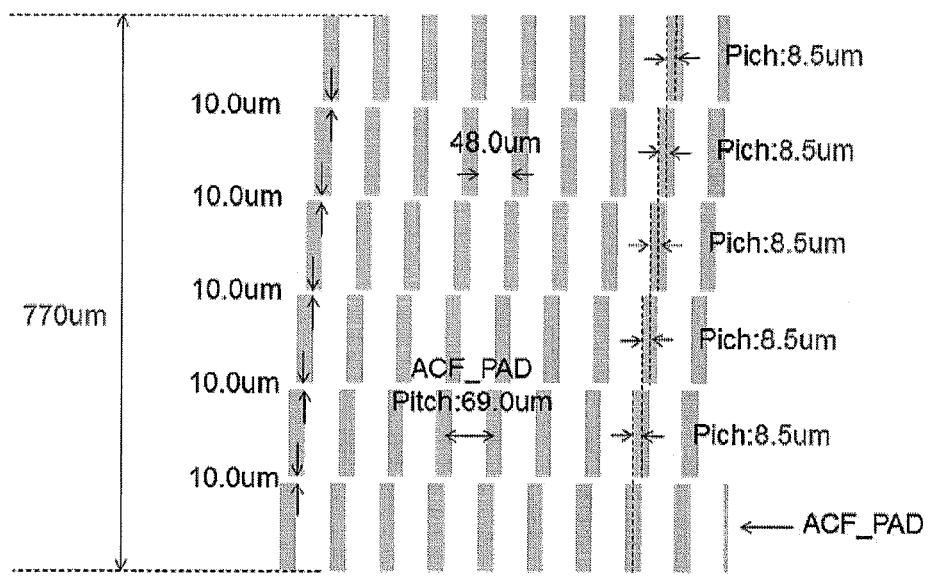
FIGS. 16A and 16B illustrate a terminal of a display panel of an embodiment.
Figure 16B:
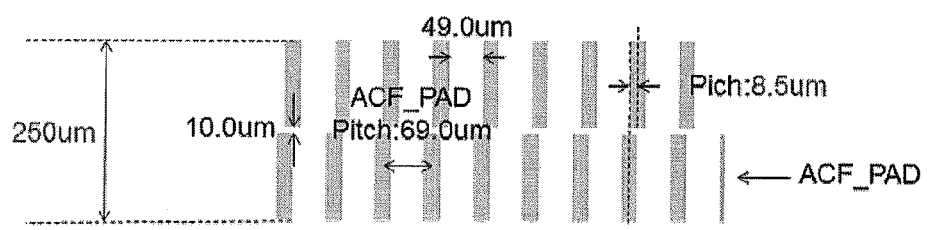

The second terminal IN(j+1) includes a conductive film 417 or/and a conductive film 418, for example (see FIGS. 12A and 12B, FIGS. 13A and 13B, and FIGS. 14A to 14D). The second terminal IN(j+1) shown in FIGS. 12A and 12B is formed with the conductive film 417 and the conductive film 418. The second terminal IN(j+1) shown in FIGS. 13A and 13B is formed with the conductive film 417. The second terminal IN(j+1) shown in FIGS. 14A to 14D is formed with the conductive film 417 and the conductive film 418. In the second terminal IN(j+1) shown in FIGS. 14A to 14D, the insulating film 521*a* includes an opening portion PA, and the insulating film 521*b* includes an opening portion TC.

For example, the conductive film 417 can be formed using the same material as a wiring electrically connected to the source electrode or the drain electrode of the transistor 502*t*. In addition, the conductive film 418 can be formed using the same material as a wiring electrically connected to the conductive film 417.

The second terminal IN(j+1) can be electrically connected to the first signal line 508(*j*+1) via the conductive film 415. The conductive film 415 can be formed using the material that can be used for the source electrode or the drain electrode of the transistor 502*t*, for example.

The insulating layer 512 can include an insulating film 402 or/and the insulating film 521*a*. The insulating film 402 can be formed using the same material as a gate insulating film of the transistor 502*t*, for example. Part of the insulating film 521 covering the transistor 502*t* can be used as the insulating film 521*a*.

<<Flexible Printed Circuit>>

The flexible printed circuit FPC1 or the flexible printed circuit FPC2 has a function of supplying an image signal, a timing signal, a control signal, power supply potential, or the like (see FIG. 1A). Further, the flexible printed circuit FPC1 or the flexible printed circuit FPC2 may be supplied with a sensor signal from the display panel 500.

The flexible printed circuit FPC3 has a function of supplying a timing signal, a control signal, power supply potential, or the like.

A printed wiring board (PWB) may be attached to the flexible printed circuit FPC3.

The flexible printed circuit FPC1 or the like may be fixed to the base 510 with the use of a resin 690 (see FIG. 12B and FIG. 13B).

Figure 17A:
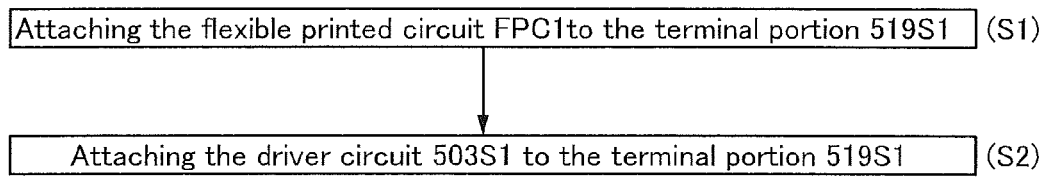
FIGS. 17A and 17B are flow charts illustrating manufacturing processes of a display panel of one embodiment.
Figure 17B:
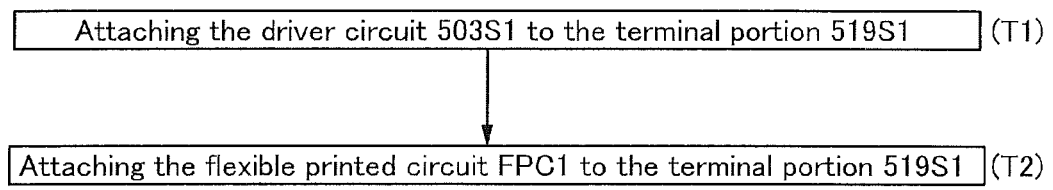

The flexible printed circuit FPC1 is attached to the terminal portion 519S1 (step S1), then, the driver circuit 503S1 is attached to the terminal portion 519S1 (step S2) (see FIG. 17A). Alternatively, the driver circuit 503S1 is attached to the terminal portion 519S1 (step T1), then, the flexible printed circuit FPC1 is attached to the terminal portion 519S1 (step T2) (see FIG. 17B).

<<Base>>

There is no particular limitation on the base 510 as long as the base 510 has heat resistance high enough to withstand a manufacturing process and a thickness and a size that allow the base 510 to be placed in a manufacturing apparatus. In particular, use of a flexible material as the base 510 enables the display panel 500 to be folded or unfolded.

For the base 510, an organic material, an inorganic material, a composite material of an organic material and an inorganic material, or the like can be used.

For example, an inorganic material such as glass, ceramic, or metal can be used for the base 510.

Specifically, non-alkali glass, soda-lime glass, potash glass, crystal glass, or the like can be used for the base 510.

Specifically, a metal oxide film, a metal nitride film, a metal oxynitride film, or the like can be used for the base 510. For example, silicon oxide, silicon nitride, silicon oxynitride, an alumina film, or the like can be used for the base 510.

For example, an organic material such as a resin, a resin film, or plastic can be used for the base 510.

Specifically, a resin film or resin plate of polyester, polyolefin, polyamide, polyimide, polycarbonate, an acrylic resin, or the like can be used for the base 510.

For example, a composite material such as a resin film to which a thin glass plate or a film of an inorganic material is attached can be used as the base 510.

For example, a composite material formed by dispersing a fibrous or particulate metal, glass, inorganic material, or the like into a resin film can be used as the base 510.

For example, a composite material formed by dispersing a fibrous or particulate resin, organic material, or the like into an inorganic material can be used as the base 510.

Further, a single-layer material or a stacked-layer material in which a plurality of layers are stacked can be used for the base 510. For example, a stacked-layer material including a base and an insulating layer that prevents diffusion of impurities contained in the base can be used for the base 510.

Specifically, a stacked-layer material including glass and one or a plurality of films that prevent diffusion of impurities contained in the glass, e.g., a silicon oxide film, a silicon nitride film, or a silicon oxynitride film can be used for the base 510.

Alternatively, a stacked-layer material including a resin and a film that prevents diffusion of impurities passing through the resin, such as a silicon oxide film, a silicon nitride film, or a silicon oxynitride film, can be used for the base 510.

Specifically, a stack including a base 510b having flexibility, a barrier film 510a preventing diffusion of impurities, and a resin layer 510c attaching the base 510b to the barrier film 510a can be used (see FIG. 2C).

In the case where the base 510 does not need a light-transmitting property, a non-light-transmitting material can be used, for example. Specifically, a magnetic or non-magnetic metal, such as a metal plate or foil of SUS, aluminum, or the like; a colored material such as a resin colored with yellow; or the like can be used.

When the shrinkage of the base 510 is less than or equal to 3%, preferably less than or equal to 2%, and more preferably less than or equal to 1%, a change in the dimensions of the display panel 500 during the manufacturing process can be suppressed.

<<Sensor Panel>>

The sensor panel 600 is provided with a sensor region 601, a control line CL(i), a signal line, or the base 610 (see FIG. 1A and FIG. 2C). Note that the detailed structure of the sensor panel 600 will be described in Embodiment 2.

A flexible material can be used for the base 610. For example, a material similar to the material for the base 510 can be used for the base 610.

Specifically, a stack including a base 610b having flexibility, a barrier film 610a preventing diffusion of impurities, and a resin layer 610c attaching the base 610b to the barrier film 610a can be used.

Note that in the case where the sensor panel 600 is positioned on a side where the display panel 500 displays an image, a light-transmitting material is used as the base 610.

<<Sealant>>

The sealant 560 has a function of bonding the base 510 to the base 610. The sealant 560 has a refractive index higher than that of air. In the case where light is extracted through the sealant 560, the sealant 560 preferably also serves as a layer with a function of optically bonding to the light-emitting element 550R that is in contact with the sealant 560.

<<Other Component>>

The input/output device 500TP includes a functional layer 670 having a region that overlaps with the display region 501.

A material preventing a scratch from being made can be used for the functional layer 670, for example. Specifically, a ceramic coat layer or a hard coat layer can be used as the functional layer 670. For example, a layer containing aluminum oxide or a UV curable resin can be used.

An anti-reflection layer that reduces the intensity of external light reflection can be used as the functional layer 670, for example. Specifically, a circular polarizing plate or the like can be used.

<Structural Example 2 of Display Panel>

Another structure of a display panel of one embodiment of the present invention will be described with reference to FIG. 3.

Figure 3:
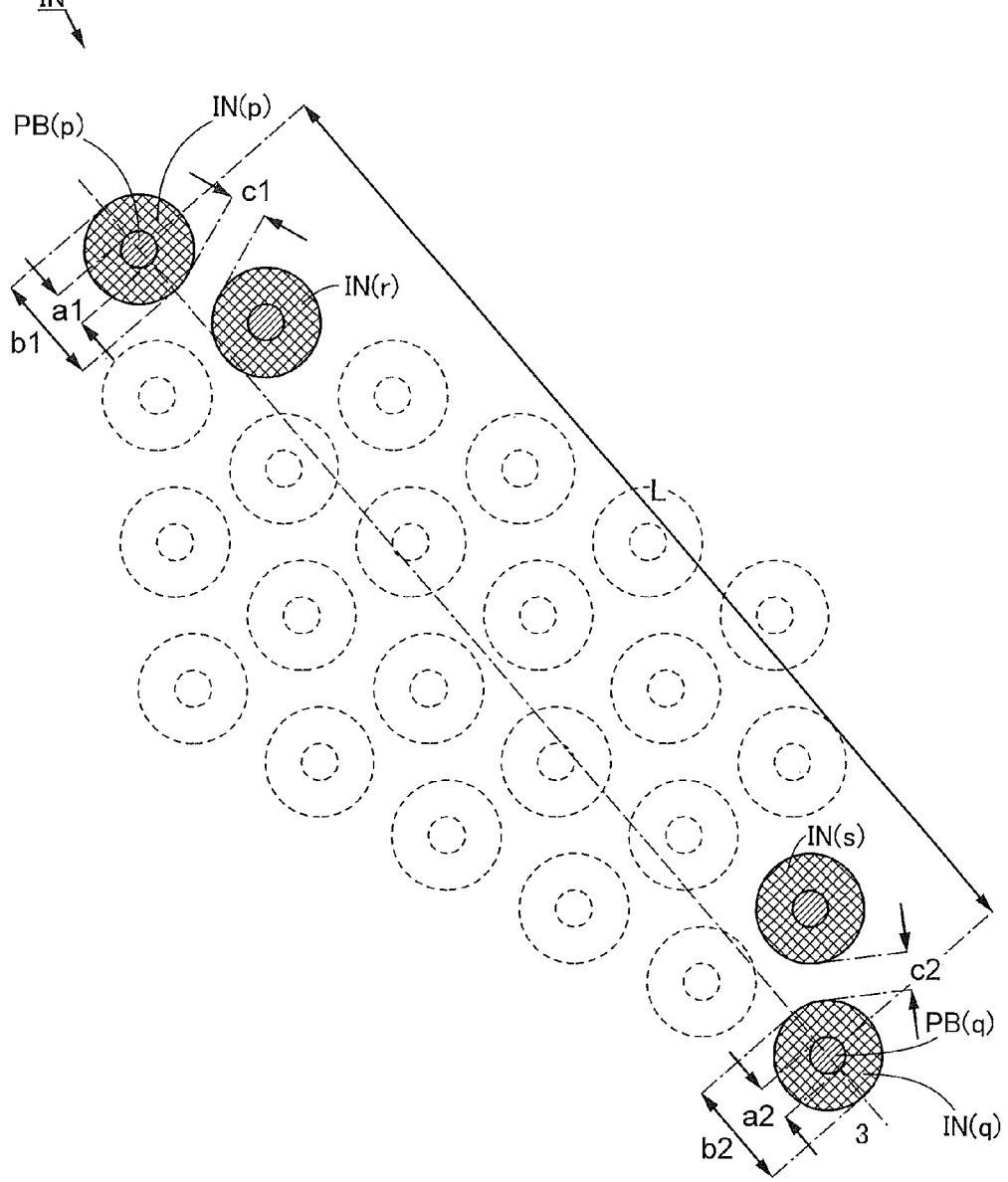
FIG. 3 illustrates the structure of a terminal portion of one embodiment.

FIG. 3 is a top view illustrating the terminal portion IN that can be included in the terminal portion 519S1 of the display panel 500 of one embodiment of the present invention. More specifically, FIG. 3 illustrates the arrangement of terminals that can be included in the terminal portion IN.

The display panel 500 described in this embodiment is provided with the terminal portion 519S1 and the driver circuit 503S1.

The terminal portion 519S1 includes the first terminal IN(j), the second terminal IN(j+1), a third terminal IN(p), and a fourth terminal IN(q) of which the center is a distance L away from the center of the third terminal IN(p) (see FIG. 3). Note that the center of gravity of the figure representing the terminal in the top view can be regarded as the center of the terminal. Although not shown, the third terminal IN(p) is connected to a third signal line, and the fourth terminal IN(q) is connected to a fourth signal line. Further, as the insulating film 521 is provided between the first signal line and the second terminal, the insulating film 521 is provided between the third signal line and the fourth terminal and between the fourth signal line and the third terminal. The third signal line is connected to a third pixel, and the fourth signal line is connected to a fourth pixel. The area of the third terminal and the area of the fourth terminal are larger than that of the third pixel and that of the fourth pixel, respectively.

The driver circuit 503S1 is arranged in the terminal portion 519S1.

The driver circuit 503S1 includes a third contact PB(p) electrically connected to the third terminal IN(p), and a fourth contact PB(q) electrically connected to the fourth terminal IN(q).

When a sum A is the sum of a distance a1 and a distance a2, and a sum B is the sum of a distance b1 and a distance b2, the sum A, the sum B, and the distance L satisfy Formula 3 below. Specifically, the distance a1 corresponds to a distance from a position where a straight line through both the center of the third terminal IN(p) and the center of the fourth terminal IN(q) starts crossing the third contact PB(p) to a position where the straight line completes crossing the third contact PB(p), and the distance a2 corresponds to a distance from a position where the straight line starts crossing the fourth contact PB(q) to a position where the straight line completes crossing the fourth contact PB(q). The distance b1 corresponds to a distance from a position where the straight line starts crossing the third terminal IN(p) to a position where the straight line completes crossing the third terminal IN(p), and the distance b2 corresponds to a distance from a position where the straight line starts crossing the fourth terminal IN(q) to a position where the straight line completes crossing the fourth terminal IN(q). Note that S is $7 \times 10^{-3}$, preferably $2 \times 10^{-3}$, and more preferably $7 \times 10^{-4}$, and S being too large reduces the productivity.

$$-1 \times S < \frac{(A+B)}{2L} < 1 \times S \qquad \text{[Formula 3]}$$

<Structural Example 3 of Display Panel>

The display panel 500 described in this embodiment is provided with the terminal portion 519S1.

The terminal portion 519S1 includes a fifth terminal IN(r) that is adjacent to the third terminal IN(p), and a sixth terminal IN(s) that is adjacent to the fourth terminal IN(q). Although not shown, the fifth terminal IN(r) is connected to a fifth signal line, and the sixth terminal IN(s) is connected to a sixth signal line. Further, as the insulating film 521 is provided between the first signal line and the second terminal, the insulating film 521 is provided between the fifth signal line and the sixth terminal and between the sixth signal line and the fifth terminal. The fifth signal line is connected to a fifth pixel, and the fourth signal line is connected to a sixth pixel. The area of the fifth terminal and the area of the sixth terminal are larger than that of the fifth pixel and that of the sixth pixel, respectively.

When C is the sum of a distance c1 between the third terminal IN(p) and the fifth terminal IN(r) and a distance c2 between the fourth terminal IN(q) and the sixth terminal IN(s); the sum A, the sum B, the sum C, and the distance L satisfy the following formula. Note that S is $7 \times 10^{-3}$, preferably $2 \times 10^{-3}$, more preferably $7 \times 10^{-4}$, and S being too large reduces the productivity.

$$-1 \times S < \frac{(-A+B+2C)}{2L} < 1 \times S \qquad \text{[Formula 4]}$$

The display panel 500 described in this embodiment includes the terminal portion IN in which a plurality of terminals, for example, the terminals IN(p) to IN(s), are arranged to satisfy the condition represented by the above formula, and the driver circuit 503S1 provided in the terminal portion IN. With this structure, even when the dimensions of the terminal portion change during the manufacturing process, for example, the contacts of the driver circuit and the terminals can be electrically connected to each other highly reliably, and an image signal, for example, can be supplied to the pixel. As a result, a novel display panel can be provided.

This embodiment can be combined with any of the other embodiments in this specification as appropriate.

Embodiment 2

In this embodiment, a structure of the input/output device 500TP of one embodiment of the present invention will be described with reference to FIG. 4.

Figure 4:
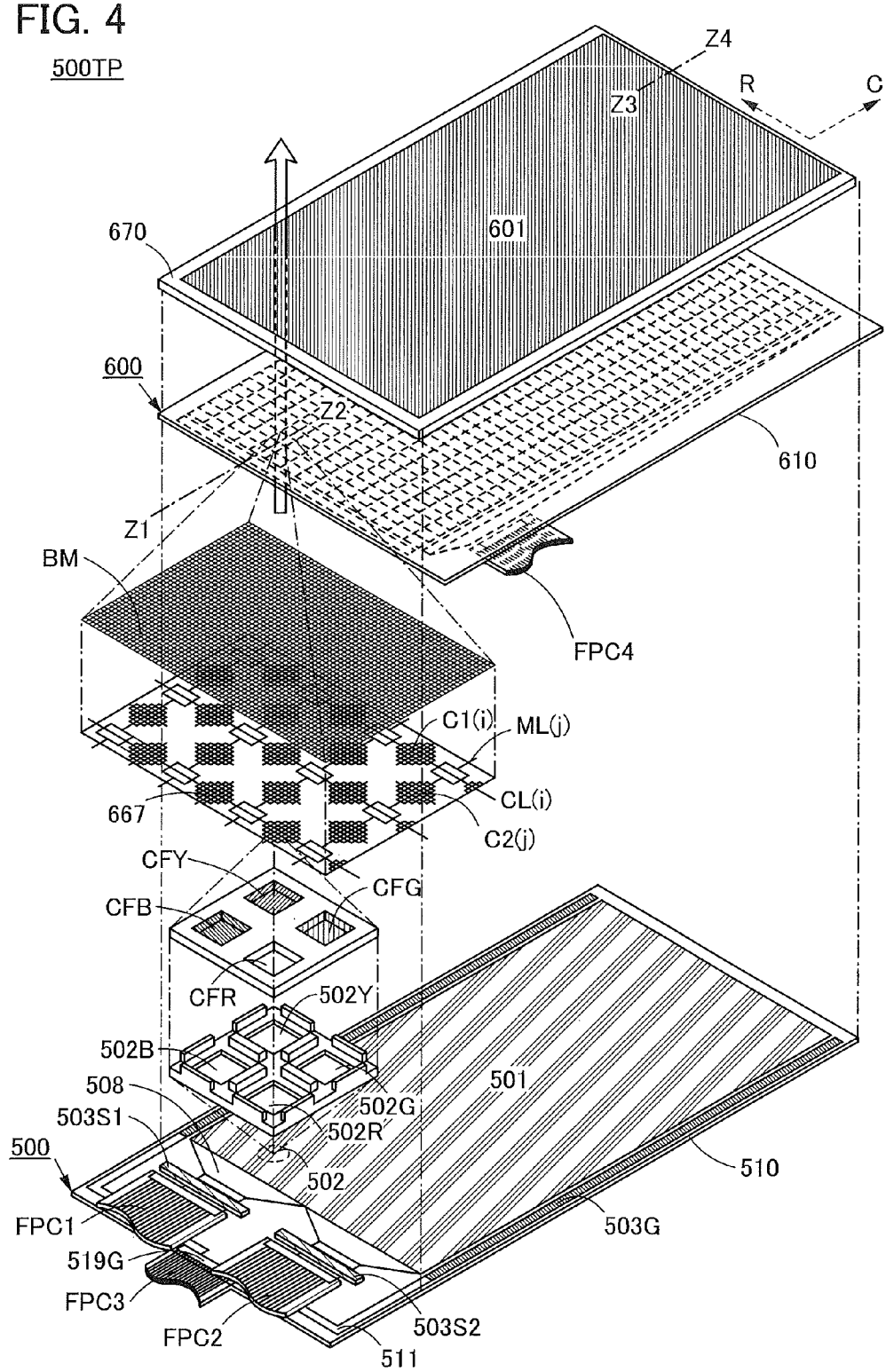
FIG. 4 illustrates an input/output device of one embodiment.

FIG. 4 is a projection view illustrating the structure of the input/output device 500TP.

<Structural Example of Input/Output Device>

The input/output device 500TP described in this embodiment includes the display panel 500 and the sensor panel 600 having a region that overlaps with the first pixel 502R and the second pixel 502B of the display panel 500.

The input/output device 500TP described in this embodiment includes the display panel 500 including the selection signal line 511(i), the first signal line 508(j) and the second signal line 508(j+1) that cross the selection signal line 511(i), the first pixel 502R that is electrically connected to the selection signal line 511(i) and the first signal line 508(j), the second pixel 502B that is electrically connected to the selection signal line 511(i) and the second signal line 508 (j+1), the first terminal IN(j) that is electrically connected to the first signal line 508(j), and the second terminal IN(j+1) that is electrically connected to the second signal line 508(j+1); and the sensor panel 600 having a region that overlaps with the first pixel 502R and the second pixel 502B.

With this structure, it becomes possible to display an image with high resolution and to supply an operation instruction in association with the displayed image data. Accordingly, a novel input/output device can be provided.

The sensor panel 600 includes the plurality of control lines including the control line CL(i) supplied with a control signal and extending in the row direction (the direction indicated by an arrow R in the figure), and the plurality of signal lines including the signal line ML(j) extending in the column direction (the direction indicated by an arrow C in the figure) and supplying a sensor signal. Moreover, the sensor panel 600 includes the base 610 that has flexibility and supports the control lines CL(i) and the signal lines ML(j).

The sensor panel 600 includes the sensor region 601. The sensor region 601 is provided with a first electrode C1(i) and a second electrode C2(j). The first electrode C1(i) is electrically connected to one control line CL(i). The second electrode C2(j) is electrically connected to one signal line ML(j) and has a portion that does not overlap with the first electrode C1(i).

The base 610 supports the first electrode C1(i) and the second electrode C2(j).

The first electrode C1(i) or the second electrode C2(j) includes a conductive film and has the net-like opening portion 667 in a region overlapping with the pixel 502 of the display panel 500.

The sensor panel 600 of the input/output device 500TP can sense sensing data and supply the sensing data together with the positional data, for example. Specifically, a user of the input/output device 500TP can make various gestures (e.g., tap, drag, swipe, and pinch in) using his/her finger or the like that approaches or is in contact with the sensor panel 600 as a pointer.

The sensor panel 600 is capable of sensing approach or contact of a finger or the like to the sensor panel 600 and supplying sensing data including the sensed position, track, or the like, for example.

With the use of the sensor panel 600, an arithmetic device, and a program for determining whether or not the sensing data supplied from the sensor panel 600 satisfies a predetermined condition, for example, an instruction associated with the gesture can be executed by the arithmetic device in the case where the predetermined condition is satisfied.

The sensor panel 600 may be electrically connected to a flexible printed circuit FPC4.

Individual components included in the input/output device 500TP will be described below. Note that these units cannot be clearly distinguished and one unit also serves as another unit or include part of another unit in some cases.

For example, the input/output device 500TP in which the sensor panel 600 is provided over the display panel 500 serves as the sensor panel 600 and also the display panel 500. Note that the input/output device 500TP in which the sensor panel 600 is provided over the display panel 500 is also referred to as a touch panel.

<<Overall Structure>>

The input/output device 500TP described in this embodiment includes the sensor panel 600 or the display panel 500.

An example of a method for manufacturing a stack that can be used for manufacturing the input/output device 500TP will be described in detail in Embodiments 3 to 5.

<<Sensor Panel>>

The sensor panel 600 includes the control line CL(i), the signal line ML(j), or the base 610.

The sensor panel 600 may be formed by depositing films for forming the sensor panel 600 over the base 610 and processing the films.

Alternatively, the sensor panel 600 may be formed in such a manner that part of the sensor panel 600 is formed over another base, and the part is transferred to the base 610.

The sensor panel 600 senses an object which approaches or touches the sensor panel 600 and supplies a sensor signal. For example, the sensor panel 600 senses capacitance, illuminance, magnetic force, a radio wave, pressure, or the like and supplies data based on the sensed physical value. Specifically, a capacitor, a photoelectric conversion element, a magnetic sensor element, a piezoelectric element, a resonator, or the like can be used as a sensor element.

For example, the sensor panel 600 senses a change in electrostatic capacitance between the sensor panel 600 and an object that approaches or is in contact with the sensor panel 600.

Note that in the air, when a finger or the like whose dielectric constant is larger than that of the air is close to the conductive film, capacitance between the finger and the conductive film is changed. The sensor panel 600 can sense the change in capacitance and supply sensing data. Specifically, the conductive film and a capacitor one electrode of which is connected to the conductive film can be used.

Distribution of charge occurs between the conductive film and the capacitor owing to the change in the electrostatic capacitance, so that the voltage between the pair of electrodes of the capacitor is changed. This voltage change can be used as the sensing signal, for example.

<<Wiring>>

The sensor panel 600 includes wirings. The wirings include the control line CL(i), the signal line ML(j), and the like.

The materials that can be used for the wirings of the display panel 500 described in Embodiment 1 can also be used for the wirings of the sensor panel 600.

<<Base>>

There is no particular limitation on the base 610 as long as the base 610 has heat resistance high enough to withstand a manufacturing process and a thickness and a size that allow the base 610 to be placed in a manufacturing apparatus. In particular, use of a flexible material as the base 610 enables the sensor panel 600 to be folded or unfolded. Note that in the case where the sensor panel 600 is positioned on a side where the display panel 500 displays an image, a light-transmitting material is used as the base 610.

The materials that can be used for the base 510 of the display panel 500 described in Embodiment 1 can also be used for the base 610 of the sensor panel 600.

<<Flexible Printed Circuit>>

The flexible printed circuit FPC4 supplies a timing signal, power supply potential, and the like, and is supplied with a sensor signal (see FIG. 4).

<<Display Panel>>

The display panel 500 described in Embodiment 1 can be used in combination with the sensor panel 600.

This embodiment can be combined with any of the other embodiments in this specification as appropriate.

Embodiment 3

In this embodiment, a method of manufacturing a stack that can be used in the manufacture of the sensor device, input device, or input/output device of one embodiment of the present invention will be described with reference to FIGS. 5A-1 and 5A-2, FIGS. 5B-1 and 5B-2, FIG. 5C, FIGS. 5D-1 and 5D-2, and FIGS. 5E-1 and 5E-2.

FIGS. 5A-1 to 5E-2 are schematic views illustrating a process of manufacturing the stack. Cross-sectional views illustrating structures of a processed member and the stack are shown on the left side of FIGS. 5A-1 to 5E-2, and top views corresponding to the cross-sectional views except FIG. 5C are shown on the right side.

<Method of Manufacturing Stack>

A method of manufacturing a stack 81 from a processed member 80 will be described with reference to FIGS. 5A-1 to 5E-2.

Figures 1, 5A:
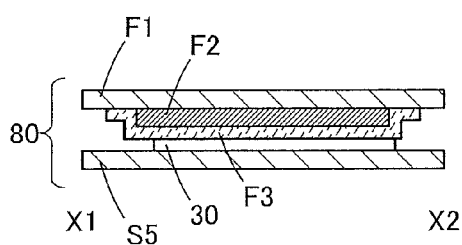
FIGS. 5A-1, 5A-2, 5B-1, 5B-2, 5C, 5D-1, 5D-2, 5E-1, and 5E-2 are schematic views illustrating a manufacturing process of a stack of one embodiment.
Figures 2, 5A:
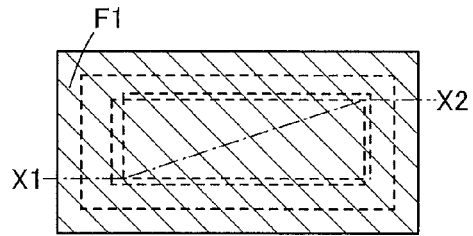

The processed member 80 includes a first substrate F1, a first separation layer F2 on the first substrate F1, a first layer F3 to be separated whose one surface is in contact with the first separation layer F2, a bonding layer 30 whose one surface is in contact with the other surface of the first layer F3 to be separated, and a base S5 in contact with the other surface of the bonding layer 30 (see FIGS. 5A-1 and 5A-2).

Note that the detailed structure of the processed member 80 will be described in Embodiment 5.

<<Formation of Separation Starting Points>>

The processed member 80 in which separation starting points F3s are formed in the vicinity of edges of the bonding layer 30 is prepared.

The separation starting point F3s is formed by separating part of the first layer F3 to be separated, from the first substrate F1.

Part of the first layer F3 to be separated can be separated from the separation layer F2 by inserting a sharp tip into the first layer F3 to be separated, from the first substrate F1 side, or by a method using a laser or the like (e.g., a laser ablation method). Thus, the separation starting point F3s can be formed.

<<First Step>>

Figures 1, 5B:
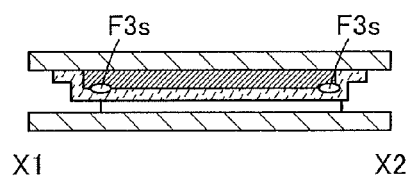
Figures 2, 5B:
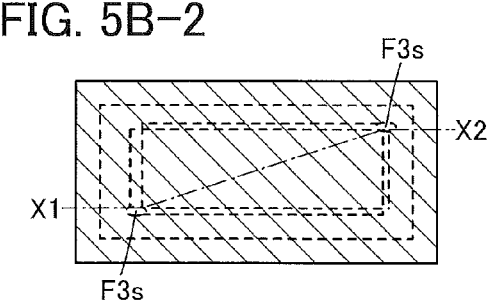
Figure 5C:
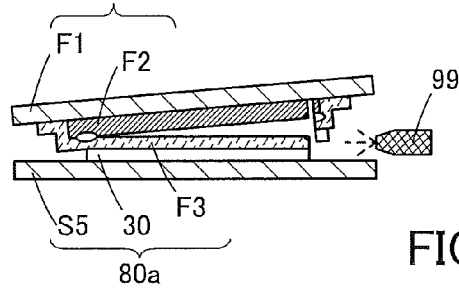
Figures 1, 5D:
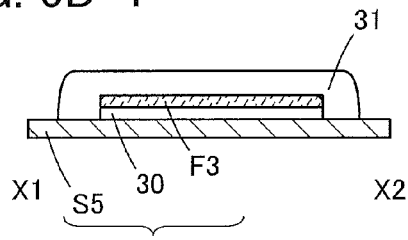
Figures 2, 5D:
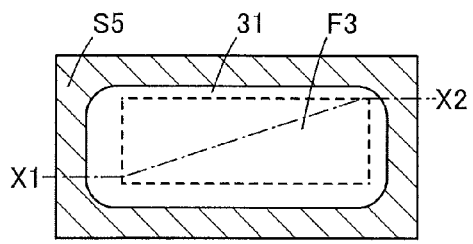

The processed member 80 in which the separation starting points F3s are formed in the vicinity of the edges of the bonding layer 30 in advance is prepared (see FIGS. 5B-1 and 5B-2).

<<Second Step>>

One surface layer 80b of the processed member 80 is separated. As a result, a first remaining portion 80a is obtained from the processed member 80.

Specifically, from the separation starting point F3s formed in the vicinity of the edge of the bonding layer 30, the first substrate F1, together with the first separation layer F2, is separated from the first layer F3 to be separated (see FIG. 5C). Consequently, the first remaining portion 80a including the first layer F3 to be separated, the bonding layer 30 whose one surface is in contact with the first layer F3 to be separated, and the base S5 in contact with the other surface of the bonding layer 30 is obtained.

The separation may be performed while the vicinity of the interface between the first separation layer F2 and the first layer F3 to be separated is irradiated with ions to remove static electricity. Specifically, the ions may be generated by an ionizer.

Furthermore, when the first layer F3 to be separated is separated from the first separation layer F2, a liquid is injected into the interface between the first separation layer F2 and the first layer F3 to be separated. Alternatively, a liquid may be ejected and sprayed by a nozzle 99. For example, as the injected liquid or the sprayed liquid, water, a polar solvent, or the like can be used.

By injecting the liquid, an influence of static electricity and the like generated with the separation can be reduced. Alternatively, the separation may be performed while a liquid that dissolves the separation layer is injected.

In particular, in the case where a film containing tungsten oxide is used as the first separation layer F2, the first layer F3 to be separated is preferably separated while a liquid containing water is injected or sprayed because a stress applied to the first layer F3 to be separated due to the separation can be reduced.

<<Third Step>>

A first adhesive layer 31 is formed on the first remaining portion 80a (see FIGS. 5D-1 and 5D-2), and the first remaining portion 80a is bonded to a first support 41 with the first adhesive layer 31. Consequently, the stack 81 is obtained from the first remaining portion 80a.

Figures 1, 5E:
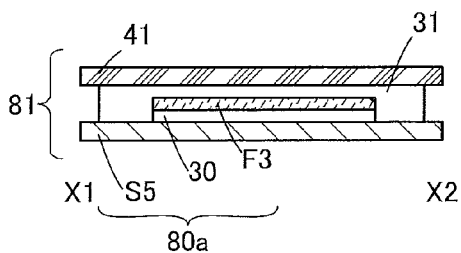
Figures 2, 5E:
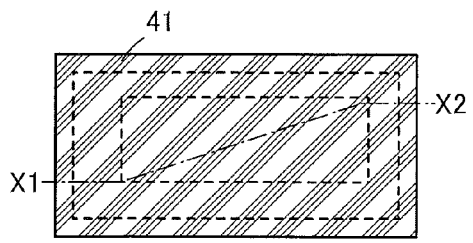

Specifically, the stack 81 including the first support 41, the first adhesive layer 31, the first layer F3 to be separated, the bonding layer 30 whose one surface is in contact with the first layer F3 to be separated, and the base S5 in contact with the other surface of the bonding layer 30 is obtained (see FIGS. 5E-1 and 5E-2).

To form the bonding layer 30, any of a variety of methods can be used. For example, the bonding layer 30 can be formed with a dispenser, by a screen printing method, or the like. The bonding layer 30 is cured by a method selected in accordance with its material. For example, when a light curable adhesive is used for the bonding layer 30, light including light of a predetermined wavelength is emitted.

This embodiment can be combined with any of the other embodiments described in this specification as appropriate.

Embodiment 4

In this embodiment, a method of manufacturing a stack that can be used in the manufacture of the sensor device, input device, or input/output device of one embodiment of the present invention will be described with reference to FIGS. 6A-1 and 6A-2, FIGS. 6B-1 and 6B-2, FIG. 6C, FIGS. 6D-1 and 6D-2, FIGS. 6E-1 and 6E-2, FIGS. 7A-1 and 7A-2, FIG. 7B, FIG. 7C, FIGS. 7D-1 and 7D-2, and FIGS. 7E-1 and 7E-2.

FIGS. 6A-1 to 6E-2 and FIGS. 7A-1 to 7E-2 are schematic views illustrating a process of manufacturing the stack. Cross-sectional views illustrating structures of a processed member and the stack are shown on the left side of FIGS. 6A-1 to 6E-2 and FIGS. 7A-1 to 7E-2, and top views corresponding to the cross-sectional views except FIG. 6C and FIGS. 7B and 7C are shown on the right side.

<Method of Manufacturing Stack>

A method of manufacturing a stack 92 from a processed member 90 will be described with reference to FIGS. 6A-1 to 6E-2 and FIGS. 7A-1 to 7E-2.

The processed member 90 is different from the processed member 80 in that the other surface of the bonding layer 30 is in contact with one surface of a second layer S3 to be separated instead of the base S5.

Specifically, the difference is that a stack including the second substrate S1, a second separation layer S2 over the second substrate S1, and the second layer S3 to be separated whose other surface is in contact with the second separation layer S2 is provided instead of the base S5, and that one surface of the second layer S3 to be separated is in contact with the other surface of the bonding layer 30.

Figures 1, 6A:
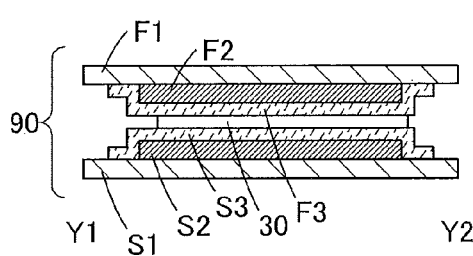
Figures 2, 6A:
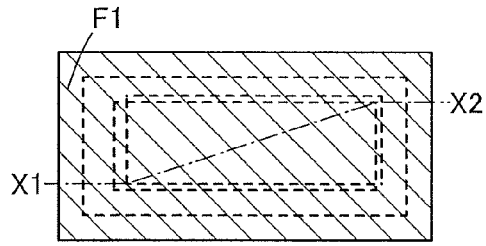

In the processed member 90, the first substrate F1, the first separation layer F2, the first layer F3 to be separated whose one surface is in contact with the first separation layer F2, the bonding layer 30 whose one surface is in contact with the other surface of the first layer F3 to be separated, the second layer S3 to be separated whose one surface is in contact with the other surface of the bonding layer 30, the second separation layer S2 whose one surface is in contact with the other surface of the second layer S3 to be separated, and the second substrate S1 are placed in this order (see FIGS. 6A-1 and 6A-2).

Note that the detailed structure of the processed member 90 will be described in Embodiment 5.

<<First Step>>

Figures 1, 6B:
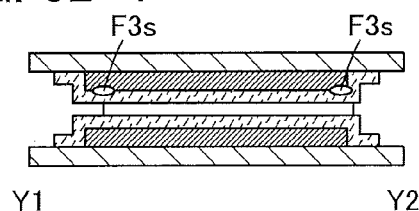
Figures 2, 6B:
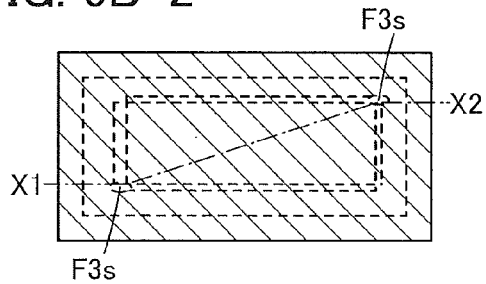
Figure 6C:
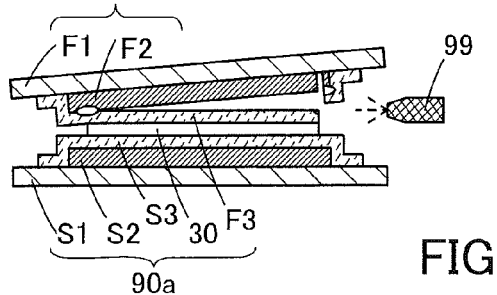
Figures 1, 6D:
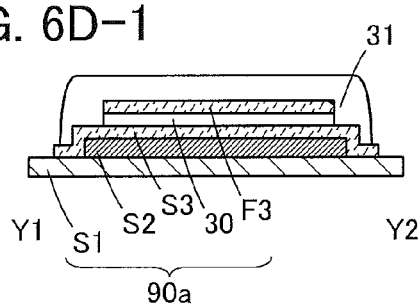
Figures 2, 6D:
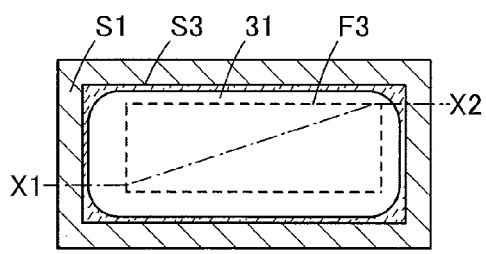

The processed member 90 in which the separation starting points F3s are formed in the vicinity of the edges of the bonding layer 30 is prepared (see FIGS. 6B-1 and 6B-2).

The separation starting point F3s is formed by separating part of the first layer F3 to be separated, from the first substrate F1.

For example, part of the first layer F3 to be separated can be separated from the separation layer F2 by inserting a sharp tip into the first layer F3 to be separated, from the first substrate F1 side, or by a method using a laser or the like (e.g., a laser ablation method). Thus, the separation starting point F3s can be formed.

<<Second Step>>

One surface layer 90b of the processed member 90 is separated. As a result, a first remaining portion 90a is obtained from the processed member 90.

Specifically, from the separation starting point F3s formed in the vicinity of the edge of the bonding layer 30, the first substrate F1, together with the first separation layer F2, is separated from the first layer F3 to be separated (see FIG. 6C). Consequently, the first remaining portion 90a in which the first layer F3 to be separated, the bonding layer 30 whose one surface is in contact with the first layer F3 to be separated, the second layer S3 to be separated whose one surface is in contact with the other surface of the bonding layer 30, the second separation layer S2 whose one surface is in contact with the other surface of the second layer S3 to be separated, and the second substrate S1 are placed in this order is obtained.

Note that the separation may be performed while the vicinity of the interface between the second separation layer S2 and the second layer S3 to be separated is irradiated with ions to remove static electricity. Specifically, the ions may be generated by an ionizer.

Furthermore, when the second layer S3 to be separated is separated from the second separation layer S2, a liquid is injected into the interface between the second separation layer S2 and the second layer S3 to be separated. Alternatively, a liquid may be ejected and sprayed by a nozzle 99. For example, as the liquid to be injected or the liquid to be sprayed, water, a polar solvent, or the like can be used.

By injecting the liquid, an influence of static electricity and the like generated with the separation can be reduced. Alternatively, the separation may be performed while a liquid that dissolves the separation layer is injected.

In particular, in the case where a film containing tungsten oxide is used as the second separation layer S2, the second layer S3 to be separated is preferably separated while a liquid containing water is injected or sprayed because a stress applied to the second layer S3 to be separated due to the separation can be reduced.

<<Third Step>>

A first adhesive layer 31 is formed on the first remaining portion 90a (see FIGS. 6D-1 and 6D-2), and the first remaining portion 90a is bonded to a first support 41 with the first adhesive layer 31. Consequently, a stack 91 is obtained from the first remaining portion 90a.

Figures 1, 6E:
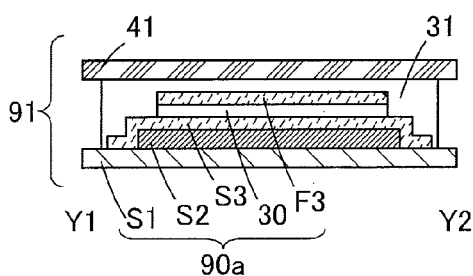
Figures 2, 6E:
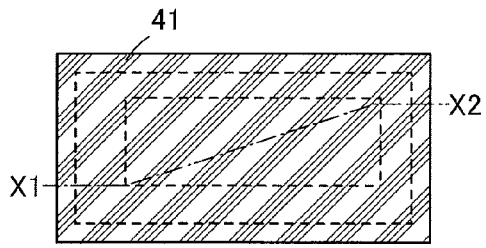

Specifically, the stack 91 in which the first support 41, the first adhesive layer 31, the first layer F3 to be separated, the bonding layer 30 whose one surface is in contact with the first layer F3 to be separated, the second layer S3 to be separated whose one surface is in contact with the other surface of the bonding layer 30, the second separation layer S2 whose one surface is in contact with the other surface of the second layer S3 to be separated, and the second substrate S1 are placed in this order is obtained (see FIGS. 6E-1 and 6E-2).

<<Fourth Step>>

Part of the second layer S3 to be separated in the vicinity of the edge of the first adhesive layer 31 of the stack 91 is separated from the second substrate S1 to form a separation starting point 91s.

For example, the first support 41 and the first adhesive layer 31 are cut from the first support 41 side, and part of the second layer S3 to be separated is separated from the second substrate S1 along an edge of the first adhesive layer 31 which is newly formed.

Figures 1, 7A:
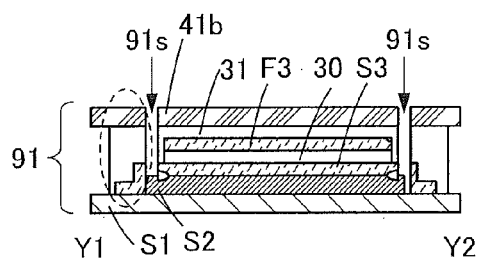
Figures 2, 7A:
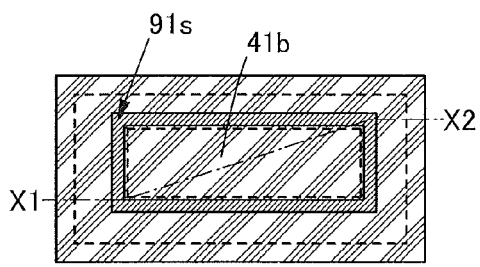
Figure 7B:
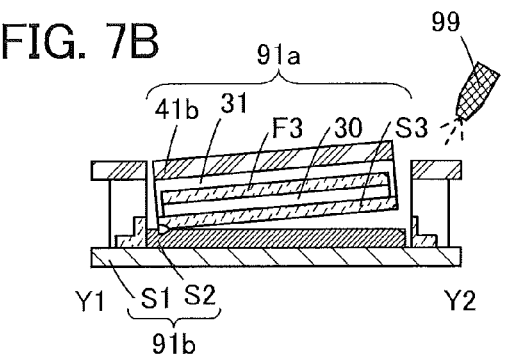
Figure 7C:
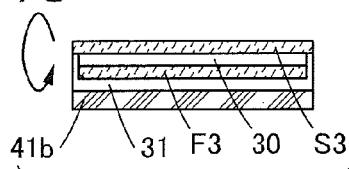

Specifically, the first adhesive layer 31 and the first support 41 in a region which is over the second separation layer S2 and in which the second layer S3 to be separated is provided are cut with a blade or the like including a sharp tip, and along a newly formed edge of the first adhesive layer 31, the second layer S3 to be separated is partly separated from the second substrate S1 (see FIGS. 7A-1 and 7A-2).

Consequently, the separation starting points 91s are formed in the vicinity of newly formed edges of the first support 41b and the first adhesive layer 31.

<<Fifth Step>>

A second remaining portion 91a is separated from the stack 91. As a result, the second remaining portion 91a is obtained from the stack 91 (see FIG. 7C).

Specifically, from the separation starting point 91s formed in the vicinity of the edge of the first adhesive layer 31, the second substrate S1, together with the second separation layer S2, is separated from the second layer S3 to be separated. Consequently, the second remaining portion 91a in which the first support 41b, the first adhesive layer 31, the first layer F3 to be separated, the bonding layer 30 whose one surface is in contact with the first layer F3 to be separated, and the second layer S3 to be separated whose one surface is in contact with the other surface of the bonding layer 30 are placed in this order is obtained.

Note that the separation may be performed while the vicinity of the interface between the second separation layer S2 and the second layer S3 to be separated is irradiated with ions to remove static electricity. Specifically, the ions may be generated by an ionizer.

Furthermore, when the second layer S3 to be separated is separated from the second separation layer S2, a liquid is injected into the interface between the second separation layer S2 and the second layer S3 to be separated. Alternatively, a liquid may be ejected and sprayed by a nozzle 99. For example, as the liquid to be injected or the liquid to be sprayed, water, a polar solvent, or the like can be used.

By injecting the liquid, an influence of static electricity and the like generated with the separation can be reduced. Alternatively, the separation may be performed while a liquid that dissolves the separation layer is injected.

In particular, in the case where a film containing tungsten oxide is used as the second separation layer S2, the second layer S3 to be separated is preferably separated while a liquid containing water is injected or sprayed because a stress applied to the second layer S3 to be separated due to the separation can be reduced.

<<Sixth Step>>

Figures 1, 7D:
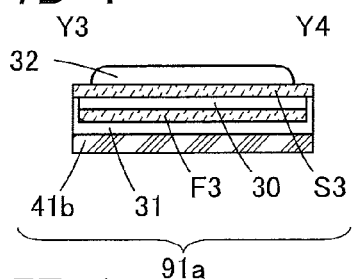
Figures 2, 7D:
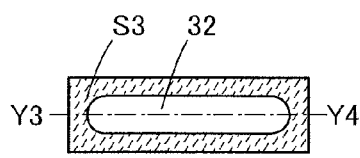
Figures 1, 7E:
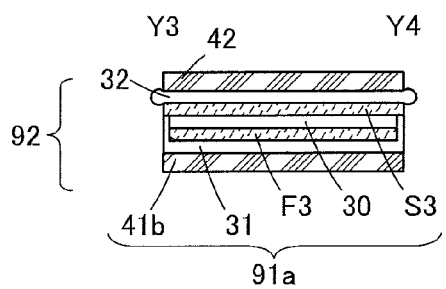
Figures 2, 7E:
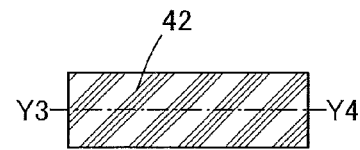

A second adhesive layer 32 is formed on the second remaining portion 91a (see FIGS. 7D-1 and 7D-2).

The second remaining portion 91a is bonded to the second support 42 with the second adhesive layer 32. Consequently, a stack 92 is obtained from the second remaining portion 91a (see FIGS. 7E-1 and 7E-2).

Specifically, the stack 92 in which first support 41b, the first adhesive layer 31, the first layer F3 to be separated, the bonding layer 30 whose one surface is in contact with the first layer F3 to be separated, the second layer S3 to be separated whose one surface is in contact with the other surface of the bonding layer 30, the second adhesive layer 32, and the second support 42 are placed in this order is obtained.

<Method of Manufacturing Stack Including Opening Portion in Support>

A method of manufacturing a stack including an opening portion in a support will be described with reference to FIGS. 8A-1 and 8A-2, FIGS. 8B-1 and 8B-2, FIGS. 8C-1 and 8C-2, and FIGS. 8D-1 and 8D-2.

FIGS. 8A-1 to 8D-2 illustrate the method of manufacturing a stack including an opening portion which exposes part of a layer to be separated in a support. Cross-sectional views illustrating structures of the stack are shown on the left side of FIGS. 8A-1 to 8D-2, and top views corresponding to the cross-sectional views are shown on the right side.

FIGS. 8A-1 to 8B-2 illustrate a method of manufacturing a stack 92c including an opening portion by using a second support 42b that of area is smaller than that of the first support 41b.

FIGS. 8C-1 to 8D-2 illustrate a method of manufacturing a stack 92d including an opening portion formed in the second support 42.

<<Example 1 of Method of Manufacturing Stack Including Opening Portion in Support>>

This method of manufacturing a stack has the same steps as the above except that the second support 42b that of area is smaller than that of the first support 41b is used instead of the second support 42 in the sixth step. By this method, a stack in which part of the second layer S3 to be separated is exposed can be manufactured (see FIGS. 8A-1 and 8A-2).

As the second adhesive layer 32b, a liquid adhesive can be used. Alternatively, an adhesive whose fluidity is inhibited and which is formed in a single wafer shape in advance (also referred to as a sheet-like adhesive) can be used. By using the sheet-like adhesive, the amount of part of the second adhesive layer 32b which extends beyond the second support 42b can be small. In addition, the second adhesive layer 32b can have a uniform thickness easily.

Part of the second layer S3 to be separated, which is exposed, may be cut off, such that the first layer F3 to be separated is exposed (see FIGS. 8B-1 and 8B-2).

Specifically, with a blade or the like which has a sharp tip, a slit is formed in the exposed second layer S3 to be separated. Then, for example, an adhesive tape or the like is attached to part of the exposed second layer S3 to be separated to concentrate stress near the slit, and the part of the exposed second layer S3 to be separated is separated together with the attached tape or the like, whereby the part of the second layer S3 to be separated can be selectively removed.

Moreover, a layer that can suppress the bonding power of the bonding layer 30 to the first layer F3 to be separated may be selectively formed on part of the first layer F3 to be separated. For example, a material that is not easily bonded to the bonding layer 30 may be selectively formed. Specifically, an organic material may be deposited into an island shape. Thus, part of the bonding layer 30 can be selectively removed together with the second layer S3 to be separated easily. As a result, the first layer F3 to be separated can be exposed.

Note that for example, in the case where the first layer F3 to be separated includes a functional layer and a conductive layer F3b electrically connected to the functional layer, the conductive layer F3b can be exposed in an opening portion in the second stack 92c. Thus, the conductive layer F3b exposed in the opening portion can be used as a terminal supplied with a signal.

As a result, the conductive layer F3b part of which is exposed in the opening portion can be used as a terminal that can extract a signal supplied though the functional layer, or can be used as a terminal to which a signal supplied to the functional layer can be supplied by an external device.

<<Example 2 of Method of Manufacturing Stack Including Opening Portion in Support>>

A mask 48 including an opening portion formed to overlap with an opening portion formed in the second support 42 is formed on the stack 92. Next, a solvent 49 is dropped into the opening portion in the mask 48. Thus, with the solvent 49, the second support 42 exposed in the opening portion in the mask 48 can be swelled or dissolved (see FIGS. 8C-1 and 8C-2).

After the extra solvent 49 is removed, stress is applied by, for example, rubbing the second support 42 exposed in the opening portion in the mask 48. Thus, the second support 42 or the like in a portion overlaps with the opening portion in the mask 48 can be removed.

Moreover, with a solvent with which the bonding layer 30 is swelled or dissolved, the first layer F3 to be separated can be exposed (see FIGS. 8D-1 and 8D-2).

This embodiment can be combined with any of the other embodiments described in this specification as appropriate.

Embodiment 5

In this embodiment, a structure of a processed member that can be processed into the sensor device, input device, or input/output device of one embodiment of the present invention will be described with reference to FIGS. 9A-1 and 9A-2 and FIGS. 9B-1 and 9B-2.

FIGS. 9A-1 to 9B-2 are schematic views illustrating a structure of a processed member that can be processed into the stack.

Figures 1, 9A:
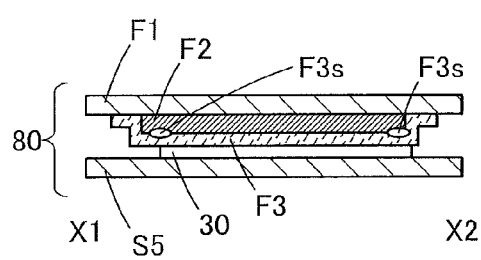
Figures 2, 9A:
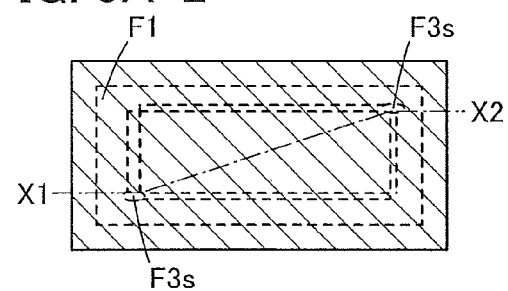

FIG. 9A-1 is a cross-sectional view illustrating a structure of the processed member 80 which can be processed into the stack, and FIG. 9A-2 is a top view corresponding to the cross-sectional view.

Figures 1, 9B:
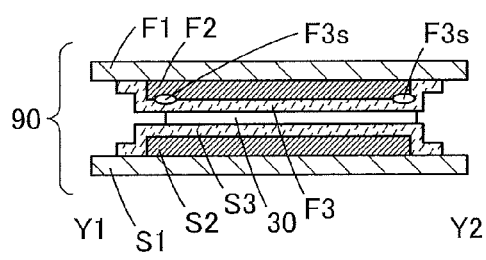
Figures 2, 9B:
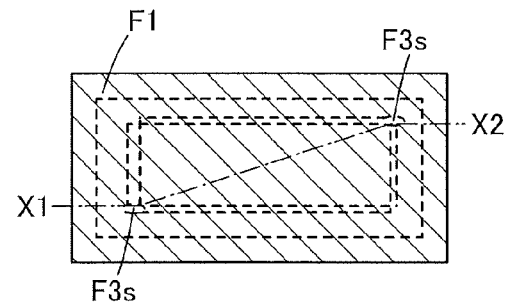

FIG. 9B-1 is a cross-sectional view illustrating a structure of the processed member 90 which can be processed into the stack, and FIG. 9B-2 is a top view corresponding to the cross-sectional view.

<Structural Example 1 of Processed Member>

The processed member 80 includes the first substrate F1, the first separation layer F2 on the first substrate F1, the first layer F3 to be separated whose one surface is in contact with the first separation layer F2, the bonding layer 30 whose one surface is in contact with the other surface of the first layer F3 to be separated, and the base S5 in contact with the other surface of the bonding layer 30 (see FIGS. 9A-1 and 9A-2).

Note that the separation starting points F3s may be formed in the vicinity of the edges of the bonding layer 30.

<<First Substrate>>

There is no particular limitation on the first substrate F1 as long as it has heat resistance high enough to withstand a manufacturing process and a thickness and a size that allow the first substrate F1 to be placed in a manufacturing apparatus.

For the first substrate F1, an organic material, an inorganic material, a composite material of an organic material and an inorganic material, or the like can be used.

For example, an inorganic material such as glass, ceramic, or metal, can be used for the first substrate F1.

Specifically, non-alkali glass, soda-lime glass, potash glass, crystal glass, or the like can be used for the first substrate F1.

Specifically, a metal oxide film, a metal nitride film, a metal oxynitride film, or the like can be used for the first substrate F1. For example, silicon oxide, silicon nitride, silicon oxynitride, an alumina film, or the like can be used for the first substrate F1.

Specifically, SUS, aluminum, or the like can be used for the first substrate F1.

For example, an organic material such as a resin, a resin film, or a plastic can be used for the first substrate F1.

Specifically, a resin film or a resin plate of polyester, polyolefin, polyamide, polyimide, polycarbonate, an acrylic resin, or the like can be used for the first substrate F1.

For example, a composite material such as a resin film to which a metal plate, a thin glass plate, or a film of an inorganic material is attached can be used as the first substrate F1.

For example, a composite material formed by dispersing a fibrous or particulate metal, glass, inorganic material, or the like into a resin film can be used as the first substrate F1.

For example, a composite material formed by dispersing a fibrous or particulate resin, organic material, or the like into an inorganic material can be used as the first substrate F1.

For the first substrate F1, a single-layer material or a stacked-layer material in which a plurality of layers are stacked can be used. For example, a stacked-layer material in which a base, an insulating layer that prevents diffusion of impurities contained in the base, and the like are stacked can be used for the first substrate F1.

Specifically, a stacked-layer material in which glass and one or a plurality of films that prevents diffusion of impurities contained in the glass and that are selected from a silicon oxide film, a silicon nitride film, a silicon oxynitride film, and the like are stacked can be used for the first substrate F1.

Alternatively, a stacked-layer material including a resin and a film that prevents diffusion of impurities passing through the resin, such as a silicon oxide film, a silicon nitride film, or a silicon oxynitride film, can be used for the first substrate F1.

<<First Separation Layer>>

The first separation layer F2 is provided between the first substrate F1 and the first layer F3 to be separated. In the vicinity of the first separation layer F2, a boundary where the first layer F3 to be separated can be separated from the first substrate F1 is formed. There is no particular limitation on the first separation layer F2 as long as it has heat resistance high enough to withstand the manufacturing process of the first layer F3 to be separated formed thereon.

For the first separation layer F2, for example, an inorganic material, an organic resin, or the like can be used.

Specifically, an inorganic material such as a metal containing an element selected from tungsten, molybdenum, titanium, tantalum, niobium, nickel, cobalt, zirconium, zinc, ruthenium, rhodium, palladium, osmium, iridium, and silicon, an alloy containing the element, or a compound containing the element can be used for the first separation layer F2.

Specifically, an organic material such as polyimide, polyester, polyolefin, polyamide, polycarbonate, or an acrylic resin can be used.

For example, a single-layer material or a stacked-layer material in which a plurality of layers are stacked can be used for the first separation layer F2.

Specifically, a material in which a layer containing tungsten and a layer containing an oxide of tungsten are stacked can be used for the first separation layer F2.

The layer containing an oxide of tungsten can be formed by a method in which another layer is stacked on a layer containing tungsten. Specifically, the layer containing an oxide of tungsten may be formed by a method in which silicon oxide, silicon oxynitride, or the like is stacked on a layer containing tungsten.

The layer containing an oxide of tungsten may be formed by subjecting a surface of a layer containing tungsten to thermal oxidation treatment, oxygen plasma treatment, nitrous oxide ($N_2O$) plasma treatment, treatment with a solution with high oxidizing power (e.g., ozone water), or the like.

Specifically, a layer containing polyimide can be used as the first separation layer F2. The layer containing polyimide has heat resistance high enough to withstand the various manufacturing steps required to form the first layer F3 to be separated.

For example, the layer containing polyimide has heat resistance of 200° C. or higher, preferably 250° C. or higher, more preferably 300° C. or higher, still more preferably 350° C. or higher.

By heating a film containing a monomer formed on the first substrate F1, a film containing polyimide obtained by condensation of the monomer can be obtained. Such a film can be used as the layer containing polyimide.

<<First Layer to be Separated>>

There is no particular limitation on the first layer F3 to be separated as long as it can be separated from the first substrate F1 and has heat resistance high enough to withstand the manufacturing process.

The boundary where the first layer F3 to be separated can be separated from the first substrate F1 may be formed between the first layer F3 to be separated and the first separation layer F2 or may be formed between the first separation layer F2 and the first substrate F1.

In the case where the boundary is formed between the first layer F3 to be separated and the first separation layer F2, the first separation layer F2 is not included in the stack. In the case where the boundary is formed between the first separation layer F2 and the first substrate F1, the first separation layer F2 is included in the stack.

An inorganic material, an organic material, a single-layer material, a stacked-layer material in which a plurality of layers are stacked, or the like can be used for the first layer F3 to be separated.

For example, an inorganic material such as a metal oxide film, a metal nitride film, or a metal oxynitride film can be used for the first layer F3 to be separated.

Specifically, silicon oxide, silicon nitride, silicon oxynitride, an alumina film, or the like can be used for the first layer F3 to be separated.

Specifically, a resin, a resin film, plastic, or the like can be used for the first layer F3 to be separated.

Specifically, a polyimide film or the like can be used for the first layer F3 to be separated.

For example, a material having a structure in which a functional layer having a region that overlaps with the first separation layer F2 and an insulating layer that is provided between the first separation layer F2 and the functional layer and can prevent diffusion of impurities which impair the function of the functional layer are stacked can be used.

Specifically, a 0.7-mm-thick glass plate is used as the first substrate F1, and a stacked-layer material in which a 200-nm-thick silicon oxynitride film and a 30-nm-thick tungsten film are stacked in this order from the first substrate F1 side is used for the first separation layer F2. In addition, a film including a stacked-layer material in which a 600-nm-thick silicon oxynitride film and a 200-nm-thick silicon nitride film are stacked in this order from the first separation layer F2 side can be used as the first layer F3 to be separated. Note that a silicon oxynitride film refers to a film that includes more oxygen than nitrogen, and a silicon nitride oxide film refers to a film that includes more nitrogen than oxygen.

Specifically, instead of the above first layer F3 to be separated, a film including a stacked-layer material of a 600-nm-thick silicon oxynitride film, a 200-nm-thick silicon nitride film, a 200-nm-thick silicon oxynitride film, a 140-nm-thick silicon nitride oxide film, and a 100-nm-thick silicon oxynitride film stacked in this order from the first separation layer F2 side can be used as the first layer F3 to be separated.

Specifically, a stacked-layer material in which a polyimide film, a layer containing silicon oxide, silicon nitride, or the like and the functional layer are stacked in this order from the first separation layer F2 side can be used.

<<Functional Layer>>

The functional layer is included in the first layer F3 to be separated.

For example, a functional circuit, a functional element, an optical element, a functional film, or a layer including a plurality of elements selected from these can be used as the functional layer.

Specifically, a display element that can be used for a display device, a pixel circuit driving the display element, a driver circuit driving the pixel circuit, a color filter, a moisture-proof film, and the like, and a layer including two or more selected from these can be given.

<<Bonding Layer>>

There is no particular limitation on the bonding layer 30 as long as it bonds the first layer F3 to be separated and the base S5 to each other.

For the bonding layer 30, an inorganic material, an organic material, a composite material of an inorganic material and an organic material, or the like can be used.

For example, a glass layer with a melting point of 400° C. or lower, preferably 300° C. or lower, an adhesive, or the like can be used.

For example, an organic material such as a light curable adhesive, a reactive curable adhesive, a thermosetting adhesive, and/or an anaerobic adhesive can be used for the bonding layer 30.

Specifically, an adhesive containing an epoxy resin, an acrylic resin, a silicone resin, a phenol resin, a polyimide resin, an imide resin, a polyvinyl chloride (PVC) resin, a polyvinyl butyral (PVB) resin, and an ethylene vinyl acetate (EVA) resin, or the like can be used.

<<Base>>

There is no particular limitation on the base S5 as long as it has heat resistance high enough to withstand a manufacturing process and a thickness and a size that allow the base S5 to be placed in a manufacturing apparatus.

A material that can be used for the base S5 can be the same as that of the first substrate F1, for example.

<<Separation Starting Point>>

In the processed member 80, the separation starting point F3s may be formed in the vicinity of the edges of the bonding layer 30.

The separation starting point F3s is formed by separating part of the first layer F3 to be separated, from the first substrate F1.

Part of the first layer F3 to be separated can be separated from the separation layer F2 by inserting a sharp tip into the first layer F3 to be separated, from the first substrate F1 side, or by a method using a laser or the like (e.g., a laser ablation method). Thus, the separation starting point F3s can be formed.

<Structural Example 2 of Processed Member>

A structure of the processed member that can be the stack and is different from the above will be described with reference to FIGS. 9B-1 and 9B-2.

The processed member 90 is different from the processed member 80 in that the other surface of the bonding layer 30 is in contact with one surface of the second layer S3 to be separated instead of the base S5.

Specifically, the processed member 90 includes the first substrate F1 on which the first separation layer F2 and the first layer F3 to be separated whose one surface is in contact with the first separation layer F2 are formed, the second substrate S1 on which the second separation layer S2 and the second layer S3 to be separated whose other surface is in contact with the second separation layer S2 are formed, and the bonding layer 30 whose one surface is in contact with the other surface of the first layer F3 to be separated and whose other surface is in contact with the one surface of the second layer S3 to be separated (see FIGS. 9B-1 and 9B-2).

<<Second Substrate>>

As the second substrate S1, a substrate similar to the first substrate F1 can be used. Note that the second substrate S1 need not necessarily to have the same structure as the first substrate F1.

<<Second Separation Layer>>

For the second separation layer S2, a structure similar to that of the first separation layer F2 can be used. For the second separation layer S2, a structure different from that of the first separation layer F2 can also be used.

<<Second Layer to be Separated>>

As the second layer S3 to be separated, a structure similar to that of the first layer F3 to be separated can be used. For the second layer S3 to be separated, a structure different from that of the first layer F3 to be separated can also be used.

Specifically, a structure may be employed in which the first layer F3 to be separated includes a functional circuit and the second layer S3 to be separated includes a functional layer that prevents diffusion of impurities into the functional circuit.

Specifically, a structure may be employed in which the first layer F3 to be separated includes a light-emitting element that emits light to the second layer S3 to be separated, a pixel circuit driving the light-emitting element, and a driver circuit driving the pixel circuit, and the second layer S3 to be separated includes a color filter that transmits part of light emitted from the light-emitting element and a moisture-proof film that prevents diffusion of impurities into the light-emitting element. Note that the processed member with such a structure can be used for a stack that can be used as a flexible display device.

This embodiment can be combined with any of the other embodiments in this specification as appropriate.

Embodiment 6

In this embodiment, a structure of a data processor that can be formed using the display panel or the input/output device of one embodiment of the present invention will be described with reference to FIGS. 10A to 10C.

Figure 10A:
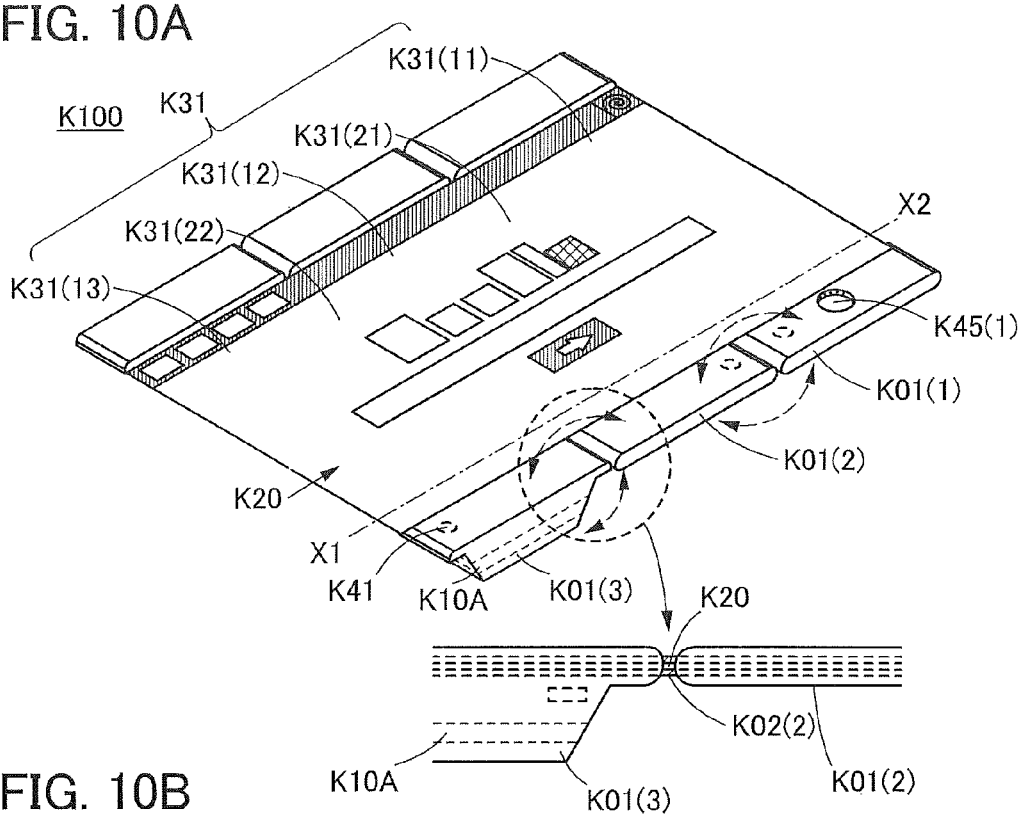
FIGS. 10A to 10C are projection views and cross-sectional views illustrating a structure of a data processor of one embodiment.
Figure 10B:
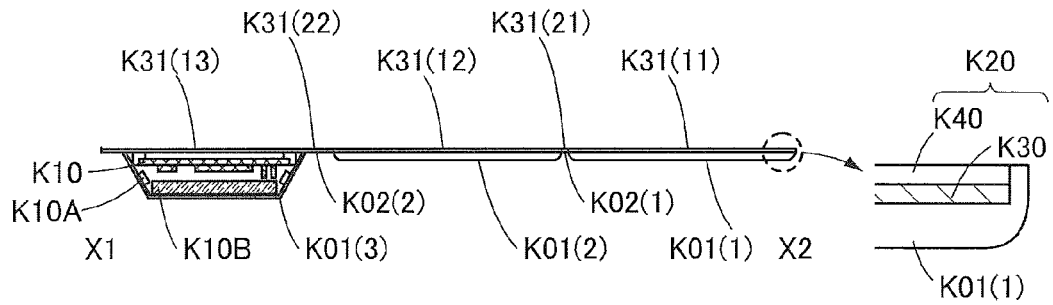
Figure 10C:
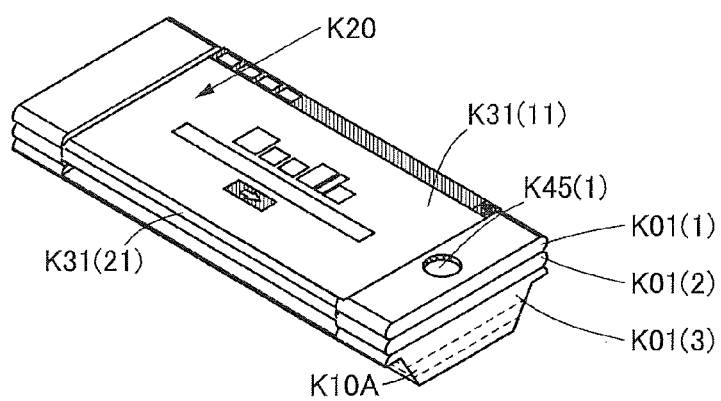

FIGS. 10A to 10C illustrate the data processor of one embodiment of the present invention.

FIG. 10A is a projection view illustrating an input/output device K20 of a data processor K100 of one embodiment of the present invention which is unfolded. FIG. 10B is a cross-sectional view of the data processor K100 taken along the line X1-X2 in FIG. 10A. FIG. 10C is a projection view illustrating the input/output device K20 which is folded.

<Structural Example of Data Processor>

The data processor K100 described in this embodiment includes the input/output device K20, an arithmetic device K10, and housings K01(1) to K01(3) (see FIGS. 10A to 10C).

<<Input/Output Device>>

The input/output device K20 includes a display portion K30 and an input device K40. The input/output device K20 is supplied with image data V and supplies sensing data S.

The display portion K30 is supplied with the image data V and the input device K40 supplies the sensing data S (see FIG. 10B).

The input/output device K20 in which the input device K40 and the display portion K30 overlap with each other serves not only as the display portion K30 but also as the input device K40.

Note that the input/output device K20 using a touch sensor as the input device K40 and a display panel as the display portion K30 can be referred to as a touch panel.

<<Display Portion>>

The display portion K30 includes a region K31 where a first region K31(11), a first bendable region K31(21), a second region K31(12), a second bendable region K31(22), and a third region K31(13) are arranged in stripes in this order (see FIG. 10A).

The display portion K30 can be folded and unfolded along a first fold line formed in the first bendable region K31(21) and a second fold line formed in the second bendable region K31(22) (see FIGS. 10A and 10C).

<<Arithmetic Device>>

The arithmetic device K10 includes an arithmetic unit and a memory unit that stores a program to be executed by the arithmetic unit. The arithmetic device K10 supplies image data V and is supplied with sensing data S.

<<Housing>>

The housings include the housing K01(1), a hinge K02(1), the housing K01(2), a hinge K02(2), and the housing K01(3) which are placed in this order.

In the housing K01(3), the arithmetic device K10 is stored. The housings K01(1) to K01(3) hold the input/output device K20, and enable the input/output device K20 to be folded and unfolded (see FIG. 10B).

In the example described in this embodiment, the data processor has the three housings connected with one another with the two hinges. The data processor having this structure can be folded with the input/output device K20 bent at two positions.

Note that n housings (n is a natural number of two or more) may be connected with one another with (n−1) hinges. The data processor having this structure can be folded with the input/output device K20 bent at (n−1) positions.

The housing K01(1) overlaps with the first region K31(11) and has a button K45(1).

The housing K01(2) overlaps with the second region K31(12).

The housing K01(3) overlaps with the third region K31(13) and stores the arithmetic device K10, an antenna K10A, and a battery K10B.

The hinge K02(1) overlaps with the first bendable region K31(21) and connects the housing K01(1) rotatably to the housing K01(2).

The hinge K02(2) overlaps with the second bendable region K31(22) and connects the housing K01(2) rotatably to the housing K01(3).

The antenna K10A is electrically connected to the arithmetic device K10 and supplies a signal or is supplied with a signal.

In addition, the antenna K10A is wirelessly supplied with power from an external device, and supplies the power to the battery K10B.

The battery K10B is electrically connected to the arithmetic device K10 and supplies power or is supplied with power.

<<Folding Sensor>>

A folding sensor K41 senses whether the housing is folded or unfolded, and supplies information showing the state of the housing.

The arithmetic device K10 is supplied with information showing the state of the housing.

When the information showing the state of the housing K01 indicates that the housing K01 is folded, the arithmetic device K10 supplies image data V including a first image to the first region K31(11) (see FIG. 10C).

When the information showing the state of the housing K01 indicates that the housing K01 is unfolded, the arithmetic device K10 supplies image data V to the region K31 of the display portion K30 (see FIG. 10A).

This embodiment can be combined with any of the other embodiments in this specification as appropriate.

Embodiment 7

In this embodiment, a structure of a data processor in which the display panel and the input/output device of one embodiment of the present invention is used in an input/output portion will be described with reference to FIGS. 11A-1 to 11A-3, FIGS. 11B-1 and 11B-2, and FIGS. 11C-1 and 11C-2.

FIGS. 11A-1 to 11C-2 illustrate the data processors each of which is one embodiment of the present invention.

Figures 1, 11A:
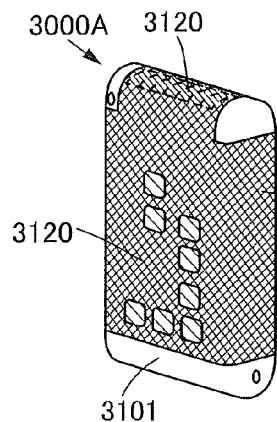
Figures 2, 11A:
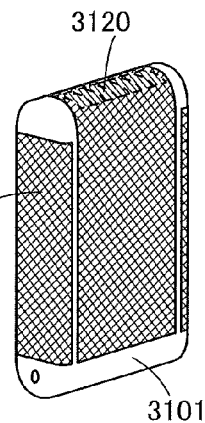
Figures 3, 11A:
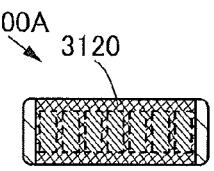

FIGS. 11A-1 to 11A-3 are projection views of a data processor of one embodiment of the present invention.

Figures 1, 11B:
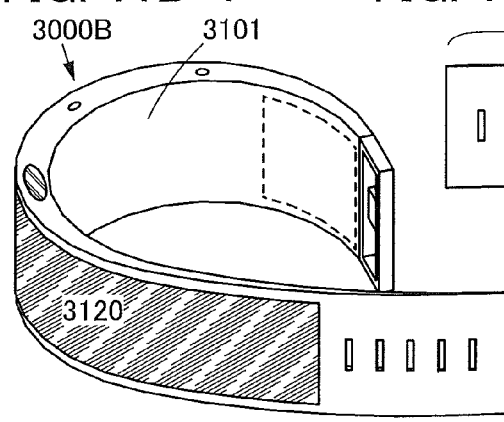
Figures 2, 11B:
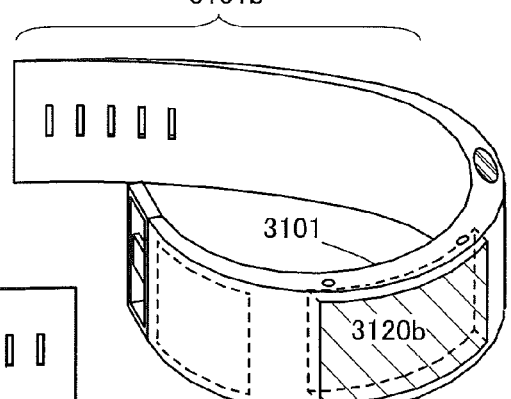

FIGS. 11B-1 and 11B-2 are projection views of a data processor of one embodiment of the present invention.

Figures 1, 11C:
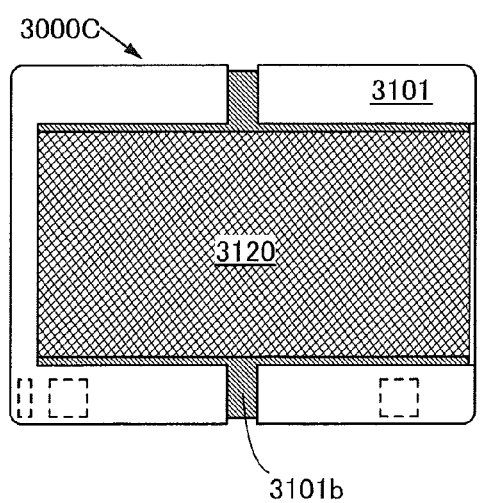
Figures 2, 11C:
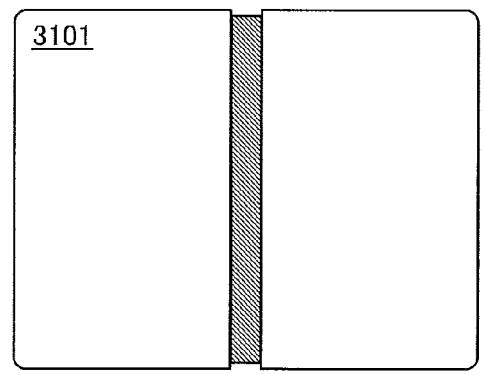

FIGS. 11C-1 and 11C-2 are a top view and a bottom view of a data processor of one embodiment of the present invention.

<<Data Processor A>>

A data processor 3000A includes an input/output portion 3120 and a housing 3101 supporting the input/output portion 3120 (see FIGS. 11A-1 to 11A-3).

The data processor 3000A further includes an arithmetic unit, a memory unit that stores a program to be executed by the arithmetic unit, and a power source such as a battery supplying power for driving the arithmetic unit.

Note that the housing 3101 houses the arithmetic unit, the memory unit, the battery, and the like.

The data processor 3000A can display display information on its side surface and/or top surface.

A user of the data processor 3000A can supply operation instructions by using a finger in contact with the side surface and/or the top surface.

<<Data Processor B>>

A data processor 3000B includes an input/output portion 3120 and an input/output portion 3120b (see FIGS. 11B-1 and 11B-2).

The data processor 3000B further includes a housing 3101 and a belt-shaped flexible housing 3101b that support the input/output portion 3120.

The data processor 3000B further includes the housing 3101 supporting the input/output portion 3120b.

The data processor 3000B further includes an arithmetic unit, a memory unit that stores a program to be executed by the arithmetic unit, and a power source such as a battery supplying power for driving the arithmetic unit.

Note that the housing 3101 houses the arithmetic unit, the memory unit, the battery, and the like.

The data processor 3000B can display display information on the input/output portion 3120 supported by the housing 3101 and the belt-shaped flexible housing 3101b.

A user of the data processor 3000B can supply operation instructions by using a finger in contact with the input/output portion 3120.

<<Data Processor C>>

A data processor 3000C includes an input/output portion 3120 and housings 3101 and 3101b supporting the input/output portion 3120 (see FIGS. 11C-1 and 11C-2). The input/output portion 3120 and the housing 3101b have flexibility.

The data processor 3000C further includes an arithmetic unit, a memory unit that stores a program to be executed by the arithmetic unit, and a power source such as a battery supplying power for driving the arithmetic unit.

Note that the housing 3101 houses the arithmetic unit, the memory unit, the battery, and the like.

The data processor 3000C can be folded in two at a portion of the housing 3101b.

This embodiment can be combined with any of the other embodiments in this specification as appropriate.

For example, in this specification and the like, when it is explicitly described that X and Y are connected, the case where X and Y are electrically connected, the case where X and Y are functionally connected, and the case where X and Y are directly connected are included therein. Accordingly, another element may be interposed between elements having a connection relation shown in drawings and texts, without limiting to a predetermined connection relation, for example, the connection relation shown in the drawings and the texts.

Here, X and Y each denote an object (e.g., a device, an element, a circuit, a wiring, an electrode, a terminal, a conductive film, a layer, or the like).

For example, in the case where X and Y are electrically connected, one or more elements that enable electrical connection between X and Y (e.g., a switch, a transistor, a capacitor, an inductor, a resistor, a diode, a display element, a light-emitting element, or a load) can be connected between X and Y. A switch is controlled to be on or off. That is, a switch is conducting or not conducting (is turned on or off) to determine whether current flows therethrough or not. Alternatively, the switch has a function of selecting and changing a current path.

For example, in the case where X and Y are functionally connected, one or more circuits that enable functional connection between X and Y (e.g., a logic circuit such as an inverter, a NAND circuit, or a NOR circuit; a signal converter circuit such as a DA converter circuit, an AD converter circuit, or a gamma correction circuit; a potential level converter circuit such as a power supply circuit (e.g., a step-up circuit or a step-down circuit) or a level shifter circuit for changing the potential level of a signal; a voltage source; a current source; a switching circuit; an amplifier circuit such as a circuit that can increase signal amplitude, the amount of current, or the like, an operational amplifier, a differential amplifier circuit, a source follower circuit, or a buffer circuit; a signal generator circuit; a memory circuit; and/or a control circuit) can be connected between X and Y. Note that for example, in the case where a signal output from X is transmitted to Y even when another circuit is interposed between X and Y, X and Y are functionally connected.

Note that in this specification, when it is described that "X and Y are connected", the case where X and Y are electrically connected (i.e., the case where X and Y are connected with another element or another circuit provided therebetween), the case where X and Y are functionally connected (i.e., the case where X and Y are functionally connected with another circuit provided therebetween), and the case where X and Y are directly connected (i.e., the case where X and Y are connected without provision of another element or another circuit therebetween) are included.

Note that, for example, the case where a source (or a first terminal or the like) of a transistor is electrically connected to X through (or not through) Z1 and a drain (or a second terminal or the like) of the transistor is electrically connected to V through (or not through) Z2, or the case where a source (or a first terminal or the like) of a transistor is directly connected to one part of Z1 and another part of Z1 is directly connected to X while a drain (or a second terminal or the like) of the transistor is directly connected to one part of Z2 and another part of Z2 is directly connected to Y, can be expressed by using any of the following expressions.

Examples of the expressions include, "X, Y, a source (or a first terminal or the like) of a transistor, and a drain (or a second terminal or the like) of the transistor are electrically connected to each other, and X, the source (or the first terminal or the like) of the transistor, the drain (or the second terminal or the like) of the transistor, and Y are electrically connected to each other in this order", "a source (or a first terminal or the like) of a transistor is electrically connected to X, a drain (or a second terminal or the like) of the transistor is electrically connected to Y, and X, the source (or the first terminal or the like) of the transistor, the drain (or the second terminal or the like) of the transistor, and Y are electrically connected to each other in this order", and "X is electrically connected to Y through a source (or a first terminal or the like) and a drain (or a second terminal or the like) of a transistor, and X, the source (or the first terminal or the like) of the transistor, the drain (or the second terminal or the like) of the transistor, and Y are provided to be connected in this order". When the connection order in a circuit configuration is defined by an expression similar to the above examples, a source (or a first terminal or the like) and a drain (or a second terminal or the like) of a transistor can be distinguished from each other to specify the technical scope. Note that these expressions are examples and there is no limitation on the expressions. Here, X, Y, Z1, and Z2 each denote an object (e.g., a device, an element, a circuit, a wiring, an electrode, a terminal, a conductive film, or a layer).

Note that what is described (or part thereof) in one embodiment can be applied to, combined with, or exchanged with another content in the same embodiment and/or what is described (or part thereof) in another embodiment or other embodiments.

Note that in each embodiment, a content described in the embodiment is a content described with reference to a variety of diagrams or a content described with a text described in this specification.

In addition, by combining a diagram (or part thereof) described in one embodiment with another part of the diagram, a different diagram (or part thereof) described in the same embodiment, and/or a diagram (or part thereof) described in another or other embodiments, much more diagrams can be formed.

Note that in this specification and the like, it might be possible for those skilled in the art to constitute one embodiment of the invention even when portions to which all the terminals of an active element (e.g., a transistor or a diode), a passive element (e.g., a capacitor or a resistor), or the like are connected are not specified. In other words, one embodiment of the invention can be clear even when connection portions are not specified. Further, in the case where a connection portion is disclosed in this specification and the like, it can be determined that one embodiment of the invention in which a connection portion is not specified is disclosed in this specification and the like, in some cases. In particular, in the case where the number of portions to which the terminal is connected might be plural, it is not necessary to specify the portions to which the terminal is connected. Therefore, it might be possible to constitute one embodiment of the invention by specifying only portions to which some of terminals of an active element (e.g., a transistor or a diode), a passive element (e.g., a capacitor or a resistor), or the like are connected.

Note that in this specification and the like, it might be possible for those skilled in the art to specify the invention when at least the connection portion of a circuit is specified. Alternatively, it might be possible for those skilled in the art to specify the invention when at least a function of a circuit is specified. In other words, when a function of a circuit is specified, one embodiment of the present invention can be clear. Further, it can be determined that one embodiment of the present invention whose function is specified is disclosed in this specification and the like. Therefore, when a connection portion of a circuit is specified, the circuit is disclosed as one embodiment of the invention even when a function is not specified, and one embodiment of the invention can be constituted. Alternatively, when a function of a circuit is specified, the circuit is disclosed as one embodiment of the invention even when a connection portion is not specified, and one embodiment of the invention can be constituted.

Note that in this specification and the like, in a diagram or a text described in one embodiment, it is possible to take out part of the diagram or the text and constitute an embodiment of the invention. Thus, in the case where a diagram or a text related to a certain portion is described, the context taken out from part of the diagram or the text is also disclosed as one embodiment of the invention, and one embodiment of the invention can be constituted. The embodiment of the invention is clear. Therefore, for example, in a diagram or text in which one or more active elements (e.g., transistors or diodes), wirings, passive elements (e.g., capacitors or resistors), conductive layers, insulating layers, semiconductor layers, organic materials, inorganic materials, components, devices, operating methods, manufacturing methods, or the like are described, part of the diagram or the text is taken out, and one embodiment of the invention can be constituted. For example, from a circuit diagram in which N circuit elements (e.g., transistors or capacitors; N is an integer) are provided, it is possible to constitute one embodiment of the invention by taking out M circuit elements (e.g., transistors or capacitors; M is an integer, where M<N). As another example, it is possible to constitute one embodiment of the invention by taking out M layers (M is an integer, where M<N) from a cross-sectional view in which N layers (N is an integer) are provided. As another example, it is possible to constitute one embodiment of the invention by taking out M elements (M is an integer, where M<N) from a flow chart in which N elements (N is an integer) are provided. As another example, it is possible to take out some given elements from a sentence "A includes B, C, D, E, or F" and constitute one embodiment of the invention, for example, "A includes B and E", "A includes E and F", "A includes C, E, and F", or "A includes B, C, D, and E".

Note that in the case where at least one specific example is described in a diagram or a text described in one embodiment in this specification and the like, it will be readily appreciated by those skilled in the art that a broader concept of the specific example can be derived. Therefore, in the diagram or the text described in one embodiment, in the case where at least one specific example is described, a broader concept of the specific example is disclosed as one embodiment of the invention, and one embodiment of the invention can be constituted. The embodiment of the invention is clear.

Note that in this specification and the like, a content described in at least a diagram (which may be part of the diagram) is disclosed as one embodiment of the invention, and one embodiment of the invention can be constituted. Therefore, when a certain content is described in a diagram, the content is disclosed as one embodiment of the invention even when the content is not described with a text, and one embodiment of the invention can be constituted. In a similar manner, part of a diagram, which is taken out from the diagram, is disclosed as one embodiment of the invention, and one embodiment of the invention can be constituted. The embodiment of the invention is clear.

This application is based on Japanese Patent Application serial no. 2014-181500 filed with Japan Patent Office on Sep. 5, 2014, the entire contents of which are hereby incorporated by reference.

What is claimed is:
1. A display panel comprising:
a base;
a terminal portion comprising a first terminal and a second terminal over the base; and
a driver circuit comprising a first contact electrically connected to the first terminal and a second contact electrically connected to the second terminal in the terminal portion,
wherein a sum A, a sum B, and a distance L satisfy the following Formula 1,

$$-7 \times 10^{-3} < \frac{(A+B)}{2L} < 7 \times 10^{-3} \qquad \text{[Formula 1]}$$

wherein the sum A is a sum of a distance a1 and a distance a2,
wherein the distance a1 is a distance from a position where a straight line through a center of the first terminal and a center of the second terminal starts crossing the first contact to a position where the straight line completes crossing the first contact,
wherein the distance a2 is a distance from a position where the straight line starts crossing the second contact to a position where the straight line completes crossing the second contact,
wherein the sum B is a sum of a distance b1 and a distance b2, wherein the distance b1 is a distance from a position where the straight line starts crossing the first terminal to a position where the straight line completes crossing the first terminal, wherein the distance b2 is a distance from a position where the straight line starts crossing the second terminal to a position where the straight line completes crossing the second terminal, and wherein the distance L is a distance between the center of the first terminal and the center of the second terminal.

2. The display panel according to claim 1, wherein the terminal portion further comprises a third terminal adjacent to the first terminal and a fourth terminal adjacent to the second terminal, and wherein the sum A, the sum B, a sum C, and the distance L satisfy the following Formula 2, $$-7 \times 10^{-3} < \frac{(-A + B + 2C)}{2L} < 7 \times 10^{-3}$$ [Formula 2]

wherein the sum C is a sum of a distance c1 and a distance c2, wherein the distance c1 is a distance between the first terminal and the third terminal, and wherein the distance c2 is a distance between the second terminal and the fourth terminal.

3. The display panel according to claim 1, further comprising:

a selection signal line over the base and electrically connected to a first pixel and a second pixel;

a first signal line crossing the selection signal line over the base and electrically connected to the first pixel; and a second signal line crossing the selection signal line over the base and electrically connected to the second pixel, wherein the first terminal electrically connected to the first signal line, wherein the second terminal electrically connected to the second signal line, and wherein the second terminal includes a first region overlapping with the first signal line with an insulating layer provided therebetween.

4. The display panel according to claim 3, wherein an area of the first terminal is larger than an area of the first pixel.

5. The display panel according to claim 3, wherein the selection signal line extends in a row direction, wherein the first signal line extends in a column direction, wherein the second signal line extends along the first signal line, and wherein a distance in the column direction between the first terminal and the second terminal is greater than or equal to 0.45 times a distance in the row direction between the first pixel and the second pixel.

6. The display panel according to claim 3, wherein the selection signal line extends in a row direction, wherein the first signal line extends in a column direction, wherein the second signal line extends along the first signal line, and wherein a distance in the column direction between the first terminal and the second terminal is greater than or equal to 1 time and less than or equal to 40 times a distance in the row direction between the first pixel and the second pixel.

7. The display panel according to claim 3, wherein an area of the third terminal is larger than an area of the first pixel.

8. The display panel according to claim 1, wherein the base has flexibility and a shrinkage of less than or equal to 3%.

9. The display panel according to claim 1, wherein the base comprises at least one of polyester, polyolefin, polyamide, polyimide, polycarbonate, and an acrylic resin.

10. An input/output device comprising:

the display panel according to claim 1; and a sensor panel including a second region overlapping with a first pixel and a second pixel of the display panel.

11. A data processor comprising:

the display panel according to claim 1; and at least one of a microphone, an antenna, a battery, an operation switch, and a housing.

* * * * *